United States Patent
Gum

(10) Patent No.: US 11,127,179 B2
(45) Date of Patent: Sep. 21, 2021

(54) DISPLAY OF A LIVE SCENE AND AUXILIARY OBJECT

(71) Applicant: QUALCOMM Incorporated, San Diego, CA (US)

(72) Inventor: Arnold Jason Gum, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/668,878

(22) Filed: Oct. 30, 2019

(65) Prior Publication Data

US 2020/0066020 A1 Feb. 27, 2020

Related U.S. Application Data

(63) Continuation of application No. 15/721,095, filed on Sep. 29, 2017, now Pat. No. 10,489,951.

(51) Int. Cl.
*G06T 19/00* (2011.01)
*G06T 11/60* (2006.01)
(Continued)

(52) U.S. Cl.
CPC ............ *G06T 11/60* (2013.01); *G01C 21/206* (2013.01); *G01C 21/3667* (2013.01);
(Continued)

(58) Field of Classification Search
None
See application file for complete search history.

(56) References Cited

U.S. PATENT DOCUMENTS 9,762,851 B1 9/2017 Baumert et al.
10,489,951 B2 11/2019 Gum
(Continued)

FOREIGN PATENT DOCUMENTS

EP 2983139 A1 2/2016

OTHER PUBLICATIONS

Alex Heath, "Clever iPhone App Brings Augmented Reality To Apple and Google Maps" https://www.cultofmac.com/201343/clever-iphone-app-brings-augmented-reality-to-apple-and-google-maps/, 2012, (Year: 2012).*

(Continued)

*Primary Examiner* — Nicholas R Wilson
(74) *Attorney, Agent, or Firm* — QUALCOMM Incorporated

(57) ABSTRACT

A mobile device comprises one or more processors, a display, and a camera configured to capture an image of a live scene. The one or more processors are configured to determine a location of the mobile device and display an augmented image based on the captured image. The augmented image includes at least a portion of the image of the live scene and a map including an indication of the determined location of the mobile device. The one or more processors are also configured to display the at least a portion of the image of the live scene in a first portion of the display and displaying the map in a second portion of the (Continued)

display. The augmented image is updated as the mobile device is moved, and the map is docked to the second portion of the display as the augmented image is updated.

20 Claims, 14 Drawing Sheets

(51) Int. Cl.
*G06F 3/01* (2006.01)
*G06T 11/00* (2006.01)
*G06Q 30/02* (2012.01)
*G01C 21/20* (2006.01)
*G01C 21/36* (2006.01)
*G06F 3/0488* (2013.01)
*H04N 7/18* (2006.01)

(52) U.S. Cl.
CPC .......... *G01C 21/3697* (2013.01); *G06F 3/011* (2013.01); *G06F 3/04883* (2013.01); *G06Q 30/0207* (2013.01); *G06T 11/00* (2013.01); *G06T 19/006* (2013.01); *H04N 7/185* (2013.01)

(56) References Cited

U.S. PATENT DOCUMENTS

2009/0322671 A1 12/2009 Scott et al.
2011/0164163 A1 7/2011 Bilbrey et al.
2012/0250940 A1 10/2012 Kasahara et al.
2013/0044128 A1 2/2013 Liu et al.

OTHER PUBLICATIONS

Basori et al. "Fast Markerless Tracking for Augmented Reality in Planar Environment", Springer, 2015. (Year: 2015).*
Glocker et al., "Dense Planar SLAM", IEEE, 2014. (Year: 2014).*
International Search Report and Written Opinion—PCT/US2018/052019—ISA/EPO—Dec. 19, 2018.
Michael Graham Richard, "Augmented Reality App Makes NYC Subway Maps Come Alive!", https://www.treehugger.com/public-transportation/augmented-reality-app-makes-nyc-subway-maps-come-al . . . , May 27, 2014, 17 pages.
Quinn P., "Google's new Visual Positioning Service will guide you through indoor locations," May 17, 2017, 5 pages.
Bhorkar G., "A Survey of Augmented Reality Navigation", ARXIV. ORG, Cornell University Library, 201 OLIN Library Cornell University Ithaca, NY, 14853, Aug. 16, 2017 (Aug. 16, 2017), 6 Pages, XP080953187.

* cited by examiner

DISPLAY OF A LIVE SCENE AND AUXILIARY OBJECT

CLAIM OF PRIORITY UNDER 35 U.S.C. § 120

The present Application for Patent is a Continuation of patent application Ser. No. 15/721,095 entitled "DISPLAY OF A LIVE SCENE AND AUXILIARY OBJECT" filed Sep. 29, 2017, pending, and assigned to the assignee hereof and hereby expressly incorporated by reference herein.

BACKGROUND

Field

The subject matter disclosed herein relates to displaying data for users, including displaying augmented reality data to augment a live scene, maps, personal and other communications, and other data.

Background

Users can capture images or video of a live scene using a camera of a mobile device and can view the captured images or video of the live scene on a display of the mobile device. However, there are no applications that generate an augmented image for presentation to the user that may include additional information not already within the captured live scene. Hence, there is interest for applications that provide the user with useful information by displaying an augmented image.

SUMMARY

An example method for displaying, in a mobile device, an augmented image can include capturing, by a camera of the mobile device, an image of a live scene; displaying the augmented image based on the captured image, the augmented image including at least one auxiliary object docked to a feature comprising a physical object visible in the captured image; and updating the augmented image as the mobile device is moved, wherein the at least one auxiliary object remains docked to the feature as the augmented image is updated. The method can optionally further include receiving an input designating the feature for docking the at least one auxiliary object; and displaying the auxiliary object docked to the designated feature. The method can also optionally further include determining a location of the mobile device. The method can include, responsive to the feature no longer being visible in the image due to movement of the mobile device, either removing the at least one auxiliary object from the augmented image or displaying the at least one auxiliary object to another feature that is visible in the captured image. The auxiliary object can include a top-down map with an indication of the determined location of the mobile device. The auxiliary object docked to the feature can be independently scalable while docked to the feature. The method can further include displaying, in addition to the at least one auxiliary object, system generated augmented reality data, which can include, for example, tags determined based on the determined location of the mobile device.

An example mobile device can include a camera configured to capture an image of a live scene, a display, a memory, and one or more processors coupled to the camera, the display, and the memory of the mobile device. The one or more processors can be configured to present an augmented image on the display based on the captured image, the augmented image including at least one auxiliary object docked to a feature comprising a physical object visible in the captured image. The one or more processors can further be configured to update the augmented image as the mobile device is moved, wherein the auxiliary object remains docked to the feature as the augmented image is updated. Furthermore, the display of the mobile device can comprise a touchscreen display configured to provide an input designating the feature for docking the at least one auxiliary object. Responsive to the input, the one or more processors can be configured to display the auxiliary object docked to the designated feature. To provide the input designating the feature, the touchscreen display can be configured to receive a tap gesture or a drag gesture by a user. Furthermore, the mobile device can include a communications subsystem configured to communicate with one or more servers to receive data for displaying the auxiliary object or for displaying augmented reality data. Additionally, the mobile device can include a location engine configured to determine a location of the mobile device, where the determined location is displayed on a map displayed as the auxiliary object. The one or more processors of the mobile device can further be configured to, responsive to the feature no longer being visible in the image due to movement of the mobile device, remove the at least one auxiliary object from the augmented image, or dock the at least one auxiliary object to another feature that is visible in the captured image.

An example apparatus for displaying an augmented image can include means for capturing an image of a live scene; means for displaying the augmented image based on the captured image and means for updating the augmented image. The means for displaying the augmented image can include means for displaying the augmented image such that the augmented image includes at least one auxiliary object docked to a feature comprising a physical object visible in the captured image. The means for updating the augmented image can include means for updating the augmented image such that, as the mobile device is moved, the at least one auxiliary object remains docked to the feature as the augmented image is updated. The apparatus can further include means for receiving an input designating the feature for docking the at least one auxiliary object. The means for receiving the input designating the feature can comprise means for receiving a tap gesture or a drag gesture to designate the feature. The apparatus can further include means for determining a location of the mobile device, and the auxiliary object can be associated with the determined location. In one example, the means for displaying the augmented image comprises means for displaying a top-down map associated with the determined location. The means for updating the augmented image can comprise means for removing the at least one auxiliary object responsive to the feature no longer being visible in the captured image due to movement of the mobile device. Alternatively, the means for updating the augmented image can comprise means for docking the at least one auxiliary object to another feature that is visible in the captured image responsive to the feature no longer being visible in the captured image due to movement of the mobile device.

An example of a non-transitory computer readable medium storing instructions for execution by one or more processors of a mobile device to perform operations comprising capturing, using a camera of the mobile device, an image of a live scene; displaying, on a display of the mobile device, an augmented image based on the captured image, the augmented image including at least one auxiliary object docked to a feature comprising a physical object visible in the captured image; and updating the augmented image on the display of the mobile device as the mobile device is moved, wherein the auxiliary object remains docked to the feature as the augmented image is updated. In one implementation, the non-transitory computer readable medium further includes instructions to process an input designating the feature for docking the at least one auxiliary object and instructions to display the auxiliary object docked to the designated feature.

DETAILED DESCRIPTION

Some example techniques are presented herein which may be implemented in various methods, means and apparatuses in a mobile device and/or in an augmented reality and/or in a navigation-related system to provide for or otherwise support the ability to display multiple kinds of information and/or data to a user.

Example techniques presented herein address various methods and apparatuses in a mobile device to possibly provide for or otherwise support displaying a live scene simultaneously with at least one non-live-scene, or auxiliary, object. Navigation applications are one example of applications that could be improved by simultaneous display of or gesture-based alternate display of live scene with an auxiliary object such as, in one example, a top-down map associated with the location of a mobile device. In an augmented reality context, the live scene can additionally be augmented by augmented reality data.

Figure 1A:
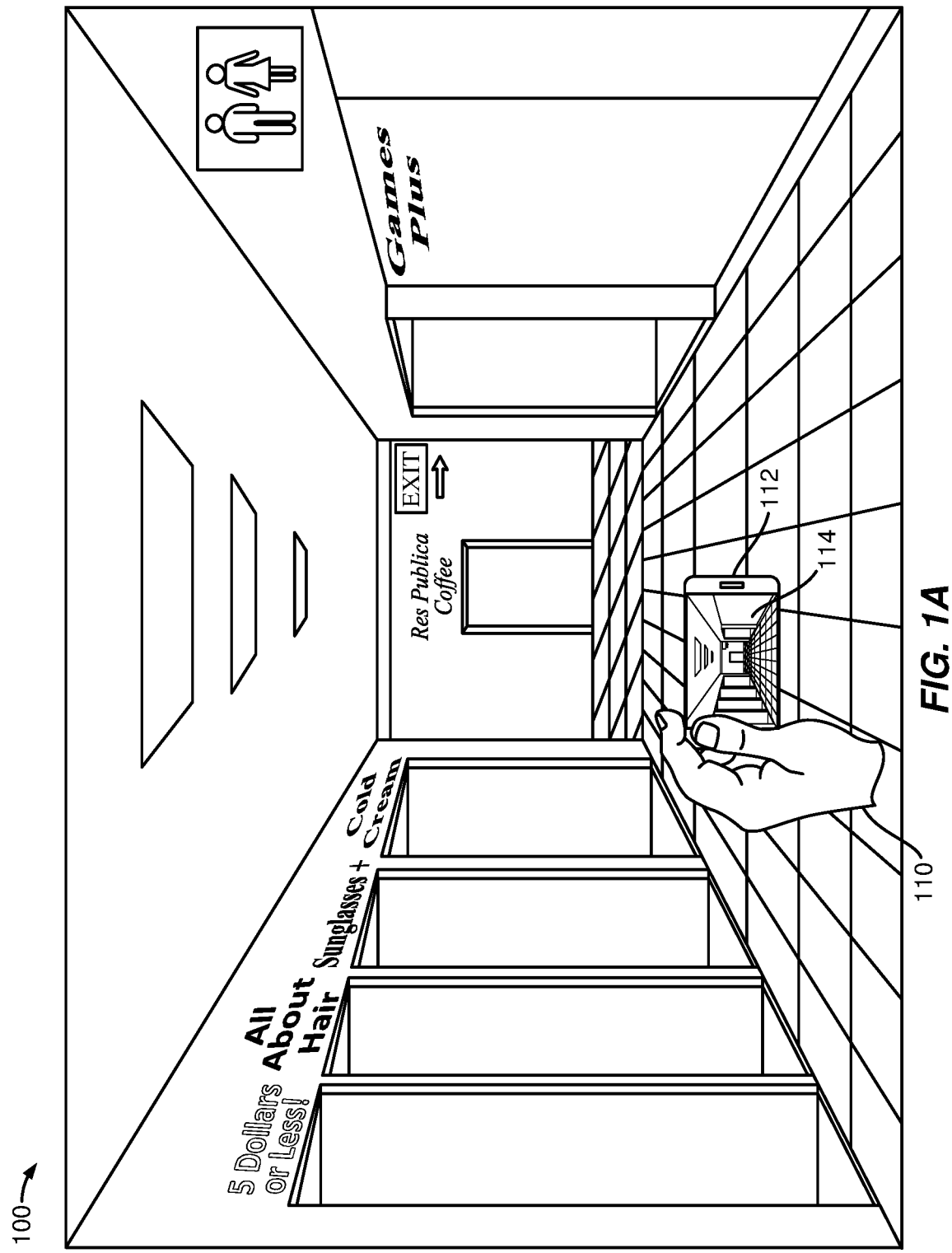
FIG. 1A illustrates a user navigating a venue.

FIG. 1A illustrates a user navigating a venue 100. As illustrated, the venue 100 is a mall, but it is understood that the venue can include any indoor or outdoor venue. More generally, the venue can include any location at which a user is using the mobile device and the surroundings of the location. As illustrated, a hand 110 of a user is holding a mobile device 112. The mobile device 112 includes a screen 114 for display of images, data, and/or information to the user. The user may use the mobile device 112 to navigate within the venue 100, and, additionally or alternatively, the user may use the mobile device 112 to access data about the environment. While navigating within the venue 100, the user may use a top-down map to understand the user's location within the venue and, for example, to navigate to a particular location within the venue or to otherwise learn more about the venue. Such a map is illustrated in FIG. 1B.

Figure 1B:
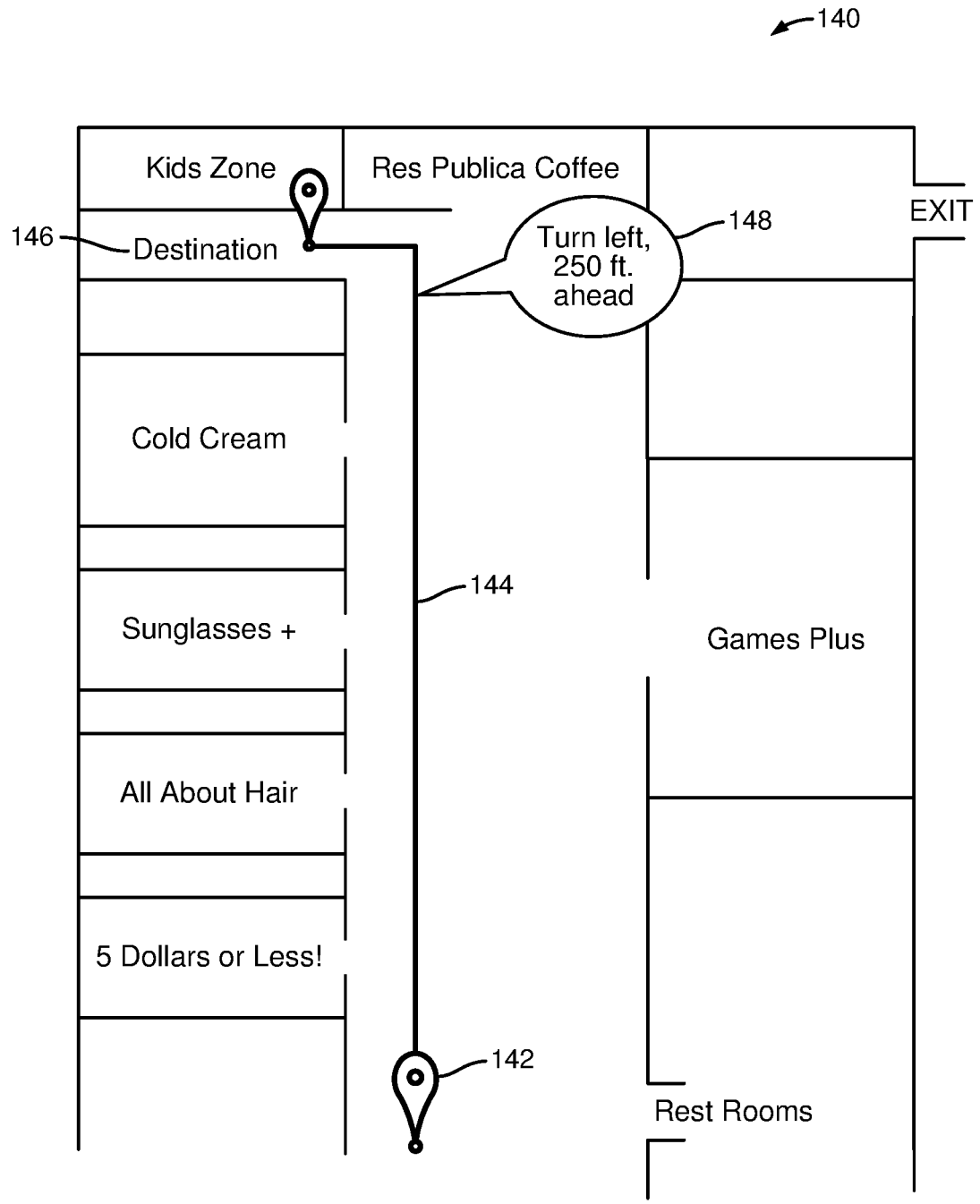
FIG. 1B illustrates a top-down map showing a location of the user inside the venue.

With continued reference to FIG. 1A, FIG. 1B illustrates a map 140 showing a location of the user inside the venue 100. The map 140 indicates the location of the user by displaying a location indicator 142, here illustrated as a dot pin drop. Map 140 may, in various implementations, be displayed on the screen 114 of the mobile device 112 to help user navigate within the venue 100. In the illustrated example, the map 140 is a top-down map and includes a route 144 to a destination location 146, here illustrated as the "KidsZone" location. The route 144 could be further augmented with text-based guidance 148 or audio-based guidance to navigate to the destination location 146. The map 140 may also illustrate or otherwise highlight points of interest along the route 144, traffic conditions (including pedestrian traffic conditions), and/or areas of slow traffic. The mobile device 112 may also receive estimated time to traverse the route or parts of the route thereof, estimated route distance, and other route related information. In an embodiment, the information may be updated as conditions change. In an embodiment, the updated received information may be sent along with ongoing navigation instruction updates.

Although not illustrated, it is also understood that the map 140 may be augmented with data related to locations in the venue 100 or user surroundings. In the illustrated example, one or more of the illustrated mall locations, "5 Dollars or Less," "All About Hair," "Sunglasses+," "Cold Cream," "Games Plus," "Res Publica Coffee," and "KidsZone," could also be associated with augmented reality data such as a displayed tag indicating a category (such as a box or other tag indicating the kind of store it is, for example, "variety store," "department store," "off-price department store," "accessories," "food," "games/hobbies," "indoor playground," etc.), information about goods or services sold by each of the one or more mall locations, and/or marketing information about promotions or sales currently in effect at each of the one or more stores.

Figure 1C:
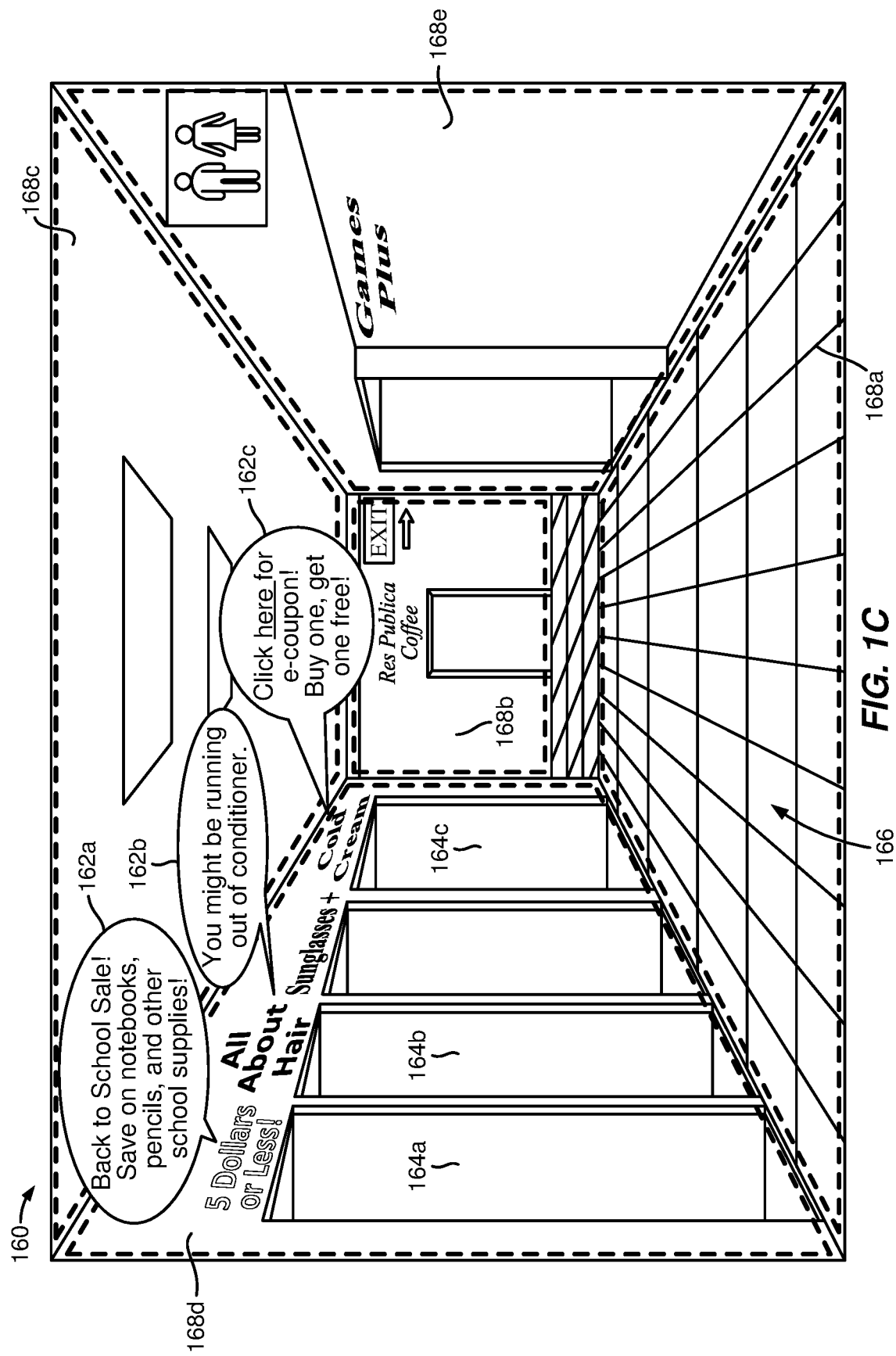
FIG. 1C illustrates an image of a mobile device camera view of a live scene displayed on the screen of a mobile device where the image of the mobile device camera view is augmented with augmented reality data.

With continued reference to FIGS. 1A and 1B, FIG. 1C illustrates an image of mobile device camera view 160 corresponding to an image of a live scene displayed on the screen 114 of a mobile device 112 where the image of mobile device camera view 160 of the live scene is augmented with augmented reality (AR) data 162a, 162b, and 162c. As used herein, AR is a live direct or indirect view of a physical, real-world environment whose elements are "augmented" by computer-generated sensory input such as sound, video, text and/or graphics, or other data. As illustrated, the AR data is displayed on an image of a mobile device camera view (the image of a mobile device camera view corresponding to an image of the live scene captured by a camera of the mobile device 112) and displayed on the screen 114 in real time. As used herein, "live scene" is intended to denote an image or series of images (for example, a video) of a mobile device camera view of the environment around the mobile device in real time. Augmentation techniques used for displaying AR data 162a-162c are typically performed in real time and use semantic context with environmental elements, such as overlaying AR data 162a-162c near or at real-world objects, such as the signage for mall locations "5 Dollars or Less," "All About Hair," and "Cold Cream," based on recognition of the real-world objects and/or mobile device location. AR can be used to integrate marketing with the image of mobile device camera view 160 to generate an augmented image. Real-world objects, environmental elements, and/or semantic context recognized in images of a live scene, for example, as illustrated, the signage 164a, 164b, 164c at mall locations bearing the name of the locations, can provide real-world context and server as a "trigger" for an AR system to display AR data 162a-162c. In other implementations, real world images containing machine readable data, such as a two dimension bar code, for example a quick response (QR) code, can serve as such a trigger.

The AR data 162a-162c can include information related to the locations. For example, the AR data 162a-162c can include information about promotions or sales at a particular location. The AR data 162a-162c can include tags, for example, determined based on the determined location of the mobile device 112 or based on features identified in the captured image of the live scene. The AR data 162a-162c can include links, for example, a link to a website associated with the location, a link to an introductory video about the goods and services sold at the location, or a link to a coupon (such as AR data 162c) or other promotional material. AR data 162a-162c can also allow a customer or prospective customer to view the interior of the location ("interior" here referring to interior relative to the illustrated corridor 166 of the mall), either by providing a link that can cause the mobile device 112 to display a new screen with images or video of the inside of the store, or additionally or alternatively, by showing such images or video within one of the illustrated call-out bubbles for displaying AR data 162a-162c, or other appropriate method for displaying such video along with, or alternative to, the image of mobile device camera view 160. In some implementations, the AR data 162a-162c is user-specific and targeted to a particular user based on other data that the system has about the user, such as a user profile, user preferences or favorites, and/or past purchases. For example, based on the date of the last purchase of conditioner for a particular user, and historical data about conditioner purchases, AR data 162b reminds the user that the user may need to buy conditioner, which is sold at the "All About Hair" mall location.

In the context of the image of mobile device camera view 160 enhanced with AR data 162a-162c, the mobile device 112 may be capable of, either independently or in conjunction with a server, identifying environment elements or other real-world-related features (where the features correspond to areas within the image) within the image of mobile device camera view 160 that have, for example, a semantic meaning useful to the user or do not have a semantic meaning but are otherwise features distinguishable from other features within the image. For example, within the image of the mobile device camera view 160 illustrated in FIG. 1C, feature 168a can be identified as a floor. Techniques such as ground homography can identify, within an image, a ground plane which can be used to identify the floor. Using other machine vision techniques, such as ridge detection, edge detection, and/or blob analysis and other machine vision techniques, other environmental elements within the image may also be identified as "features" that are distinct from other features. For example, feature 168b can be identified as a passage way through which the corridor 166 enters into a new corridor and/or corridor 166 continues to the left from said passage. In the illustrated embodiment, the passage way forms a quadrilateral associated with the feature 168b corresponding to the passage way. Similarly, feature 168c can be recognized as a ceiling and features 168d and 168e can be recognized as walls. Recognition of environmental elements which define features can be machine-based by an augmented reality system or, additionally or alternatively, they may be user-defined. Although the illustrated features 168a-168e happen to correspond to polygons or polygon-like shapes, it is understood that an feature within the image of the camera view of the live scene may be irregular (although, it is also understood that even irregular shapes can be approximated as polygons of a sufficient number of sides). For example, an feature could comprise a winding corridor or road, or a puddle, lake, or other body of water to name but a few non-limiting examples.

Since mobile device 112 users can benefit from simultaneous and/or alternative display of map data as illustrated in FIG. 1B and AR data as illustrated in FIG. 1C, methods of allowing for simultaneous or alternative display of such information can provide for improved user experience.

Figure 2A:
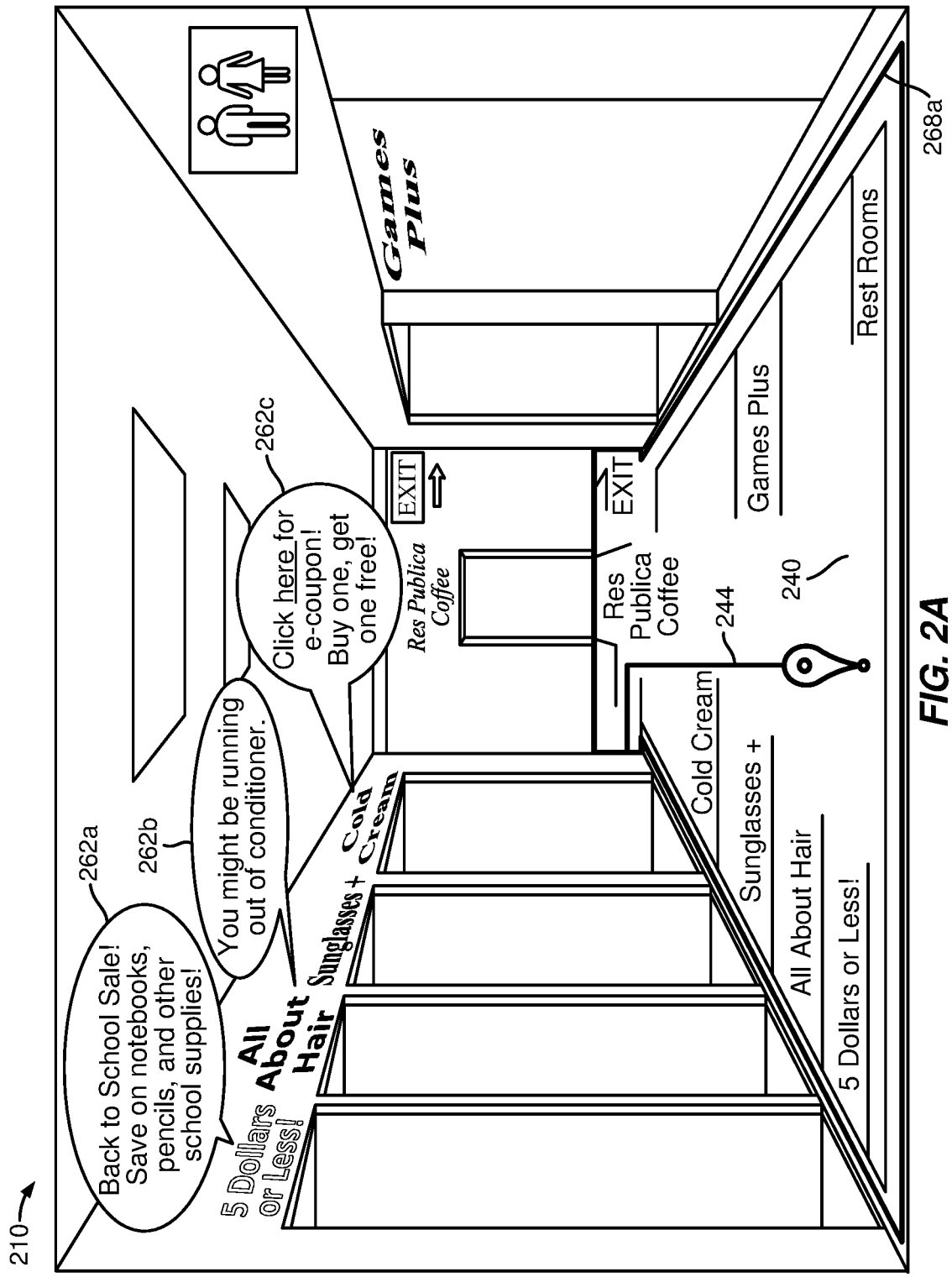
FIG. 2A illustrates an image of a mobile device camera view of a live scene displayed on the screen of a mobile device where the image is augmented with augmented reality data while an auxiliary object is docked to a feature visible in the image.
Figure 2B:
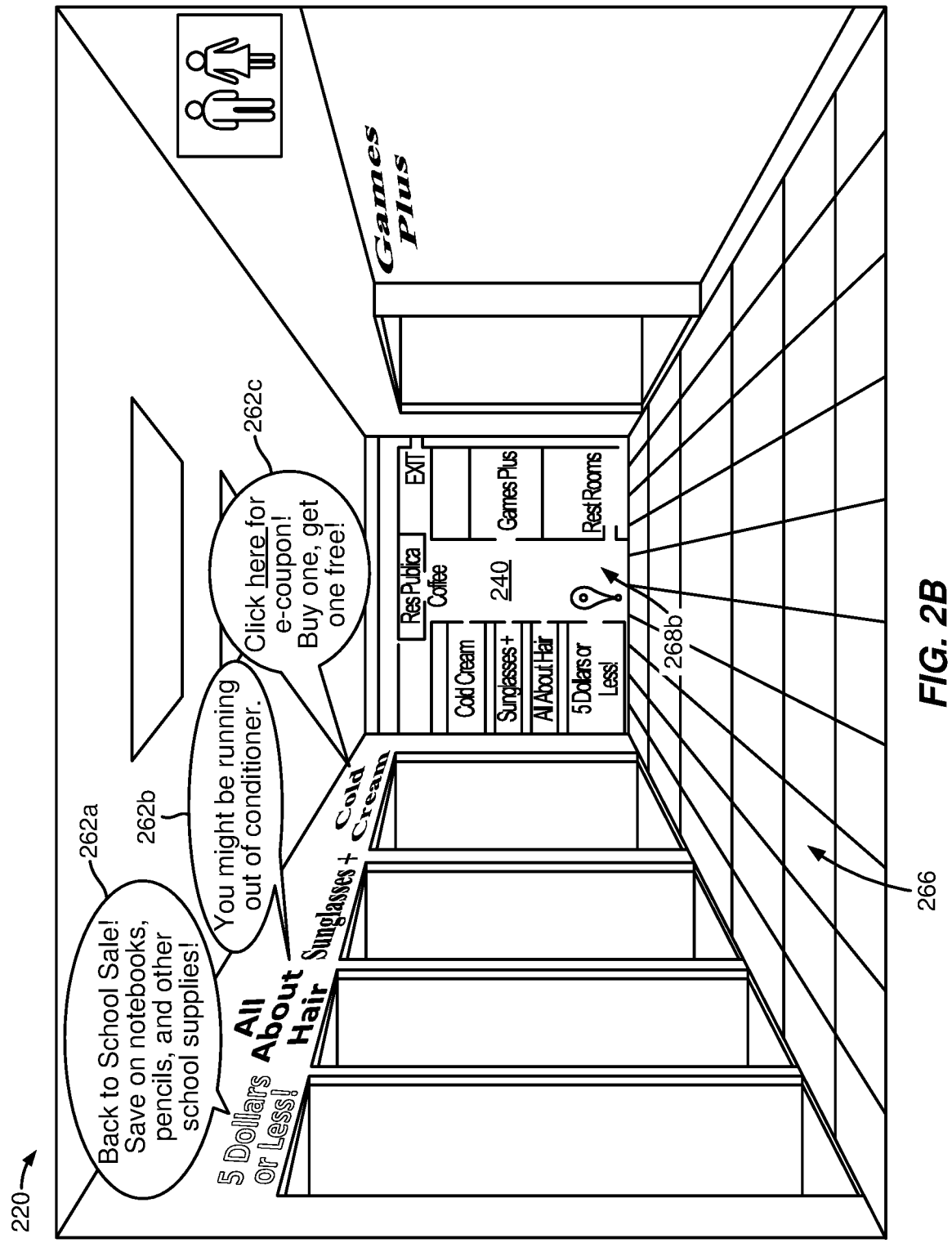
FIG. 2B illustrates an image of a mobile device camera view of a live scene similar to that illustrated in FIG. 2A where the auxiliary object is docked to a different feature in the image from FIG. 2A.

FIG. 2A illustrates an image of a mobile device camera view 210 of a live scene displayed on the screen of a mobile device (similar to screen 114 of mobile device 112 of FIG. 1A) where the image is augmented with augmented reality data while an auxiliary object is docked to a feature visible in the image. FIG. 2B illustrates an image of a mobile device camera view 220 of a live scene similar to image of mobile device camera view 210 illustrated in FIG. 2A where the auxiliary object is docked to a different feature in the image from FIG. 2A. With continued reference to both FIGS. 2A and 2B, as illustrated, the auxiliary object comprises a map 240 similar to the map 140 of FIG. 1B. For example, the map 240 can be top-down map associated with the live scene (and is also associated with a location of the mobile device). Similarly, as illustrated in FIG. 1C, the image is augmented with AR data 262a, 262b, and 262c similar to AR data 162a-162c. As illustrated in FIG. 2A, the map 240 is docked to a feature 268a corresponding to an environmental element corresponding to a floor in the image, while in FIG. 2B, the map 240 is docked to a feature 268b corresponding to an environmental element corresponding to a passage way at the end of the corridor 266. Although the environmental elements correspond to real-world/physical features such as physical objects, things, or architectural features in the live scene, from the perspective of the image of the camera view of the live scene displayed on the screen of the mobile device, the environmental element is simply an area within the image. The auxiliary object, in this example the map 240, can therefore be displayed "docked" to the area of the live scene corresponding to the, for example, physical object. Examples of physical objects corresponding to a feature visible in a captured image to which an auxiliary object may be docked can include a wall, a corner, a floor, an edge (such as an edge between a floor and a wall), a storefront, a window or other physical and/or architectural object, or a combination thereof. It is understood, however, that the "feature" visible in the image need not necessarily correspond to a physical object, but may correspond to a collection of physical objects, or to an arbitrary shape within the image. In one aspect of the auxiliary object being docked to a feature visible in the image, the auxiliary object covers a portion of the image associated with the feature. It is understood that the object may be docked to a feature visible in the captured image, but that such feature may not be, in some implementations, visible in the augmented image as the feature may be obscured by the auxiliary object.

The map 240 being docked to the a feature (such as a features 268a and 268b) visible in the captured image can be understood to mean that as the augmented image of the mobile device camera view of the live scene is updated to be displayed in real-time on the display of the mobile device, the auxiliary object remains docked to the feature of the captured image as the mobile device camera view changes as, for example, the mobile device is moved. For example, an orientation of the mobile device may change such that more or less of the area in the captured image corresponding to the feature to which the map 240 is docked shows in the captured image of the mobile device camera view, and therefore, more or less, as the case may be, of the map 240 can be displayed in subsequent displayed augmented images of the mobile device camera view. In the case of a feature that does not correspond to a physical object, for example, an arbitrarily defined area within the captured image, the mobile device, or a processor within the mobile device, may then anchor the arbitrarily defined area to keypoints within the captured image (corners, lines, shapes, etc.) so that as the mobile device moves about within the environment and due to geometric translation and/or rotation of the mobile device, the auxiliary object remains docked to the arbitrarily defined area, coming into and out of view as the keypoints within the captured image come into and out of view due to changes in the position and orientation of the mobile device.

Referring back to FIG. 1C, in image of mobile device camera view 160, a plurality of features 168a-168e were identified. In one implementation, a user interacting with the image of mobile device camera view 160 may select one of the features for display of the map 240. As such, the mobile device, a processor within the mobile device, and/or an input device of the mobile device (such as a touchscreen, for example, which may, in one example, be overlaid over a display/screen of the mobile device), may receive an input designating the feature or area of the captured image for docking the at least one auxiliary object. As illustrated in FIGS. 2A and 2B, the user selected, for example, features 168a and 168b in FIG. 1C, respectively, for display of the map 240. However, in some implementations the auxiliary object could be automatically docked to a default location or feature which may or may not then be changed by the user. Although the map has been referred herein as an auxiliary object, it is understood that, in some implementations, it may also be considered itself a type of AR data since it is an image (the image being a kind of data) that is not physically in the live scene but is added to the captured image of the camera view of the live scene by the mobile device to generate an augmented image. Although auxiliary object can be a type of AR data, it is being referred to here as a "auxiliary object" to distinguish it from other kinds of AR data, such as AR data 262a-262c. Hence, as illustrated in FIGS. 2A and 2B, the mobile device may display the image of the mobile device camera view with auxiliary object docked to features 268a, 268b while further displaying, in addition to the at least one auxiliary object, system generated AR data 262a-262c.

Map 240 shown in FIG. 2A can be displayed and oriented in different ways. For example, in one implementation, the map can be independently scalable while docked to the feature 268a of the image of the mobile device camera view 210 of the live scene. Additionally or alternatively, the map may be enlarged, reduced, panned, translated, or oriented independently of the remainder of the augmented image. In such an embodiment, the feature 268a, in this example the floor, serves as a location within the captured image where the map can be displayed. This may be useful, for example, so that features within the captured image that are of less interest to the user are used to display the map, allowing the remainder of the image for other kinds of AR data 262a-262c annotation. As illustrated, the map 240 matches the actual topology of the corridor in the live scene and includes a navigation path 244 indicating a route to a destination, for example destination 146 with reference to FIG. 146. However, it is understood that the auxiliary object docked to, in this example, the floor, can include a map that does not match the actual topology. For example, the map could be a map of the entire venue without matching locations in the map with visible objects in the live scene. Alternatively, the map docked to the floor could be a map of a different location than the venue in which the mobile device is located. As described elsewhere herein, the auxiliary object need not be a map at all, and can include a browser, a user interface for any application on the mobile device (such as a texting application, a telephone application, etc.), a display area for an image or a video, etc.

Although FIGS. 2A and 2B show embodiments in a corridor of a mall, it is understood that the camera view image may also include the inside of a store, for example one of mall locations "5 Dollars or Less," "All About Hair," "Sunglasses+," etc. For example, in FIG. 2A with the map 240 docked to the floor, when entering a store, a map of the inside of the store can be displayed in the area of the floor. AR data related to items within the store, similar to AR data 262a-262c, can displayed in coordination with the map 240. In one unillustrated example, instead of the call-out balloons illustrated in FIG. 2A, the AR data 262a-262c can include display or signpost icons within which information, such as tags indicating the merchandise displayed in different areas of the store or other information of interest and/or marketing information for shoppers within the store, can be displayed or written. Such displays or signposts could, in one example, rise out of the floor as user approaches a region within the store. In one implementation, displays and signposts are associated with the map 240 that is displayed on the floor and/or corridors on the floor.

Figure 3A:
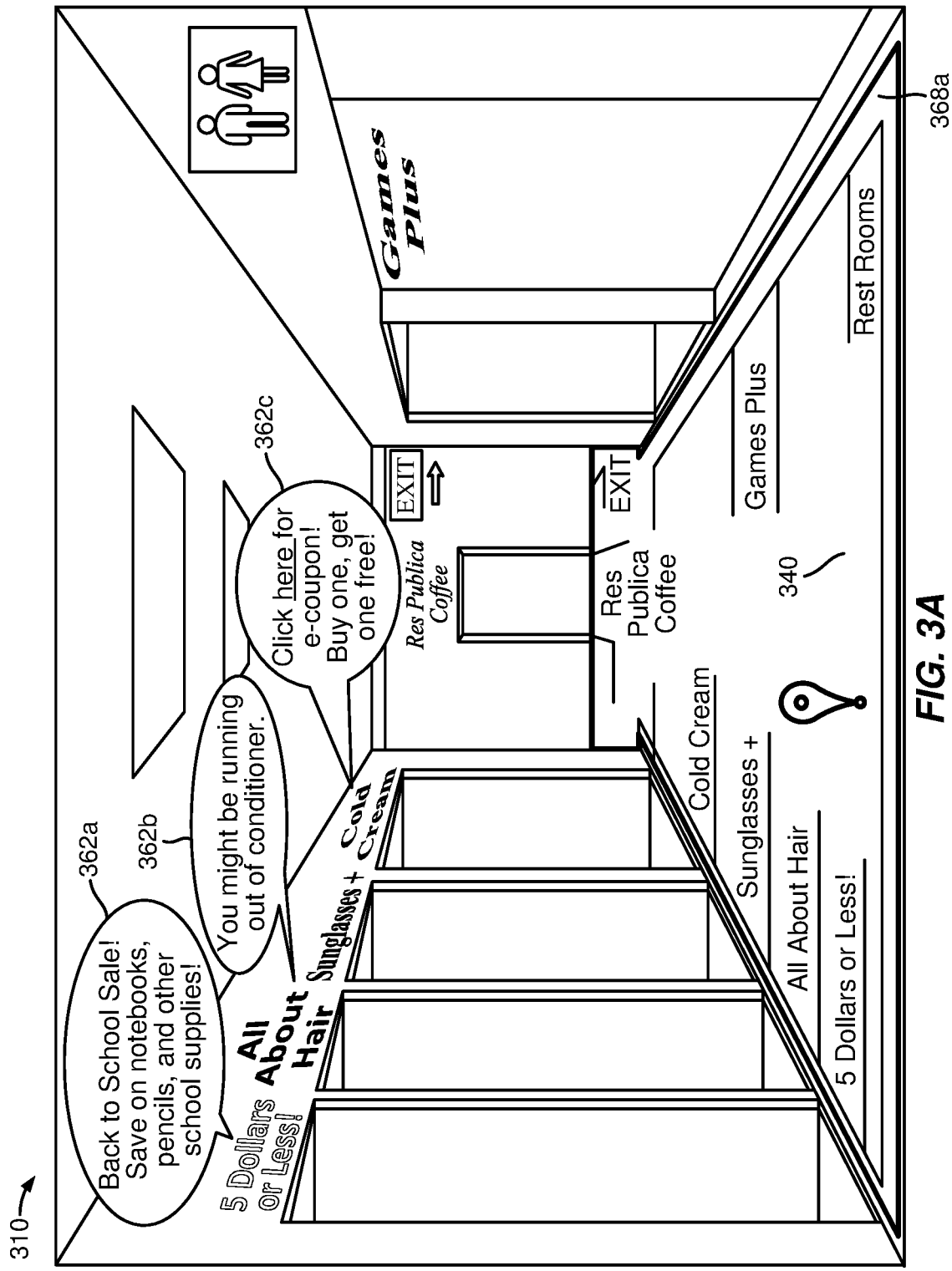
FIGS. 3A-3B illustrate embodiments of an image of a mobile device camera view of a live scene displayed on the screen of a mobile device while an auxiliary object is docked to a feature visible in the image.
Figure 3B:
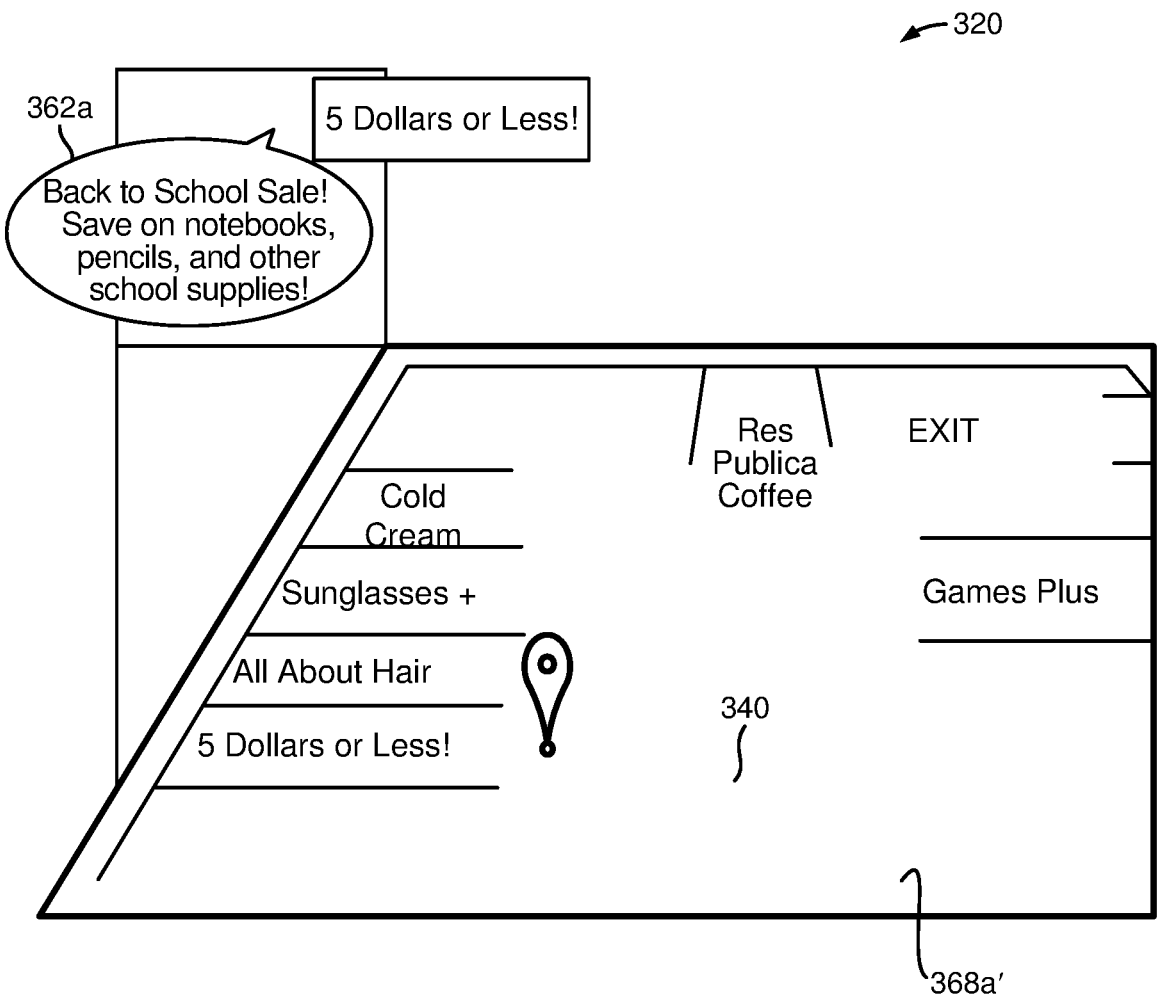

FIGS. 3A-3B illustrate embodiments of an image of a mobile device camera of a live scene displayed on the screen of a mobile device while an auxiliary object is docked to a feature visible in the image. In this example, FIG. 3A illustrates an image of a mobile device camera view 310 similar to that of FIG. 2A, while 3B illustrates an image of the mobile device camera view 320 where the mobile device has been moved and/or rotated so that the floor of the venue covers more of the screen of the mobile device as compared to FIG. 3A. Due to the change in the field of view of the captured image of the mobile device camera view, the physical signage "5 Dollars or Less" is no longer visible, and hence, AR data now includes a tag 362a' indicating the name of the store as well as a store category, "5 Dollars or Less, Discount Store." Furthermore, AR data 362a continues to be displayed pointing to what remains of the outer wall of the "5 Dollars or Less" location, while in the view illustrated in FIG. 3A, AR data 362a pointed to the physical signage.

Notably, feature 368a' in FIG. 3B covers much more of the captured image of the mobile device camera view 320 displayed on the mobile device than feature 368a in FIG. 3A. As such, map 340 is illustrated filling more of the augmented image displayed on the mobile device in FIG. 3B compared to FIG. 3A. Hence, as the augmented image of the mobile device camera view 320 was updated in real time due to the mobile device being moved, rotated, or re-oriented from the time of the capture and display of the augmented image of the mobile device camera view 310 in FIG. 3A to the time of the capture and display of the augmented image of the mobile device camera view 320 in FIG. 3B, the auxiliary object, illustrated here as map 340, remains docked to the features 368*a*, 368*a'* of the live scene as the features 368*a*, 368*a'* increase in size, decrease in size, and/or move and/or come into, and out of, view within the captured image. As illustrated, map 340 is shown at a larger scale since feature 368*a'* in FIG. 3B is larger than 368*a* in FIG. 3A. However, in alternative implementations, responsive to the increase in the size of the feature 368*a* within the captured image of the mobile device camera view due to movement of the mobile device, the screen displays a larger portion of the at least one auxiliary object at a consistent scale as the feature 368*a* goes from smaller to larger. Also, as illustrated, although there is a change in orientation and/or attitude of the mobile device from FIG. 3A to FIG. 3B, an orientation of the auxiliary object remains consistent relative, in this example, to the edge between the floor and the wall. In alternative embodiments, the orientation of the auxiliary object, in the illustrated example, map 340, could change as the orientation of the mobile device is changed. Furthermore, as illustrated in FIG. 3A, the map 340 displayed on the floor corresponds to the other actual objects in the image displayed on the screen. However, as illustrated in FIG. 3B, the map no longer corresponds to the other actual objects in the image, as the map 340 still displays the "All About Hair," "Sunglasses+," and "Cold Cream" stores even though only the entrance to the "5 Dollars or Less!" store remains visible in the image.

Figure 4A:
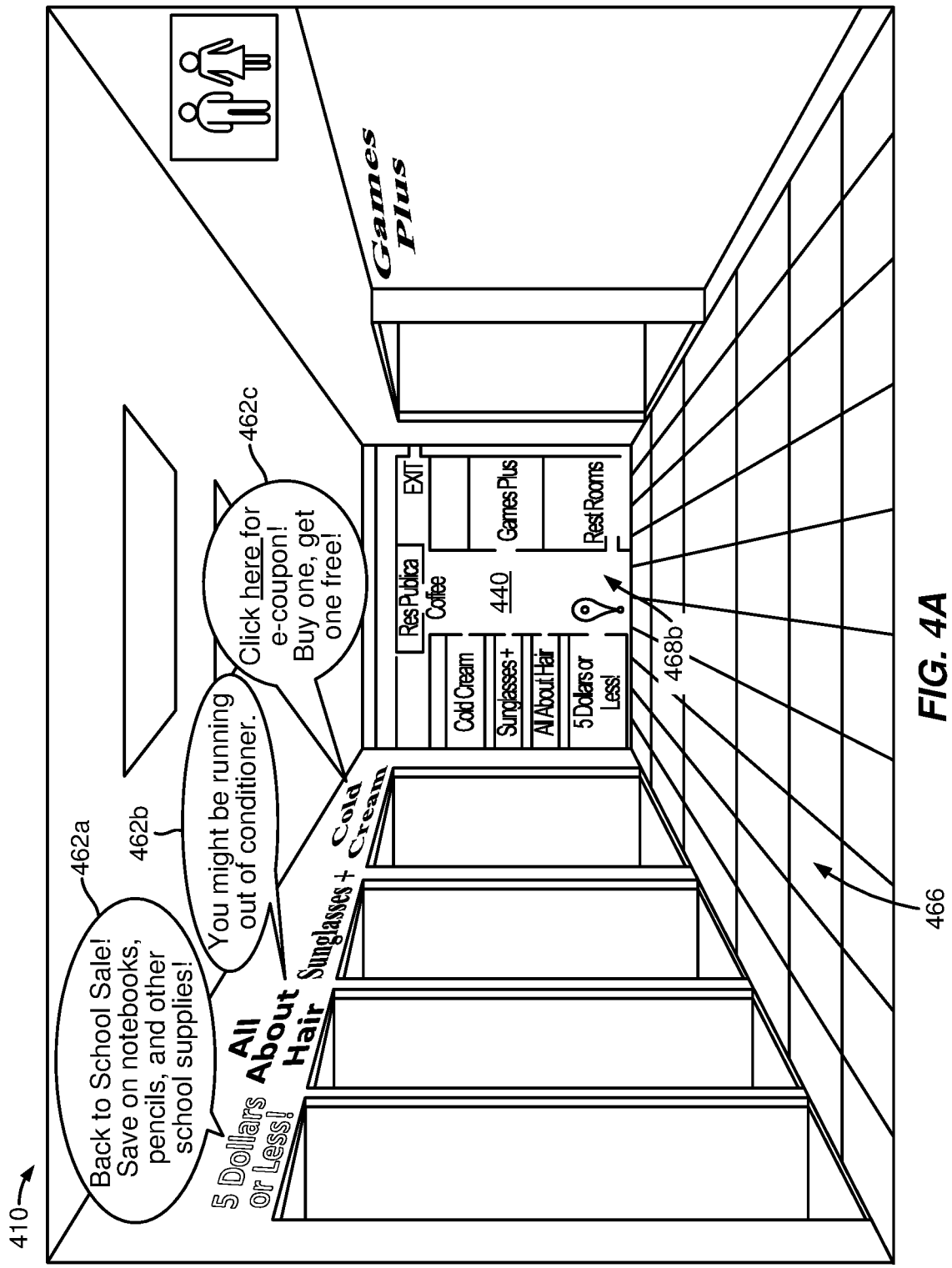
FIGS. 4A-4D illustrate embodiments of an image of a mobile device camera view of a live scene displayed on the screen of a mobile device while an auxiliary object is docked to a feature in the image.
Figure 4B:
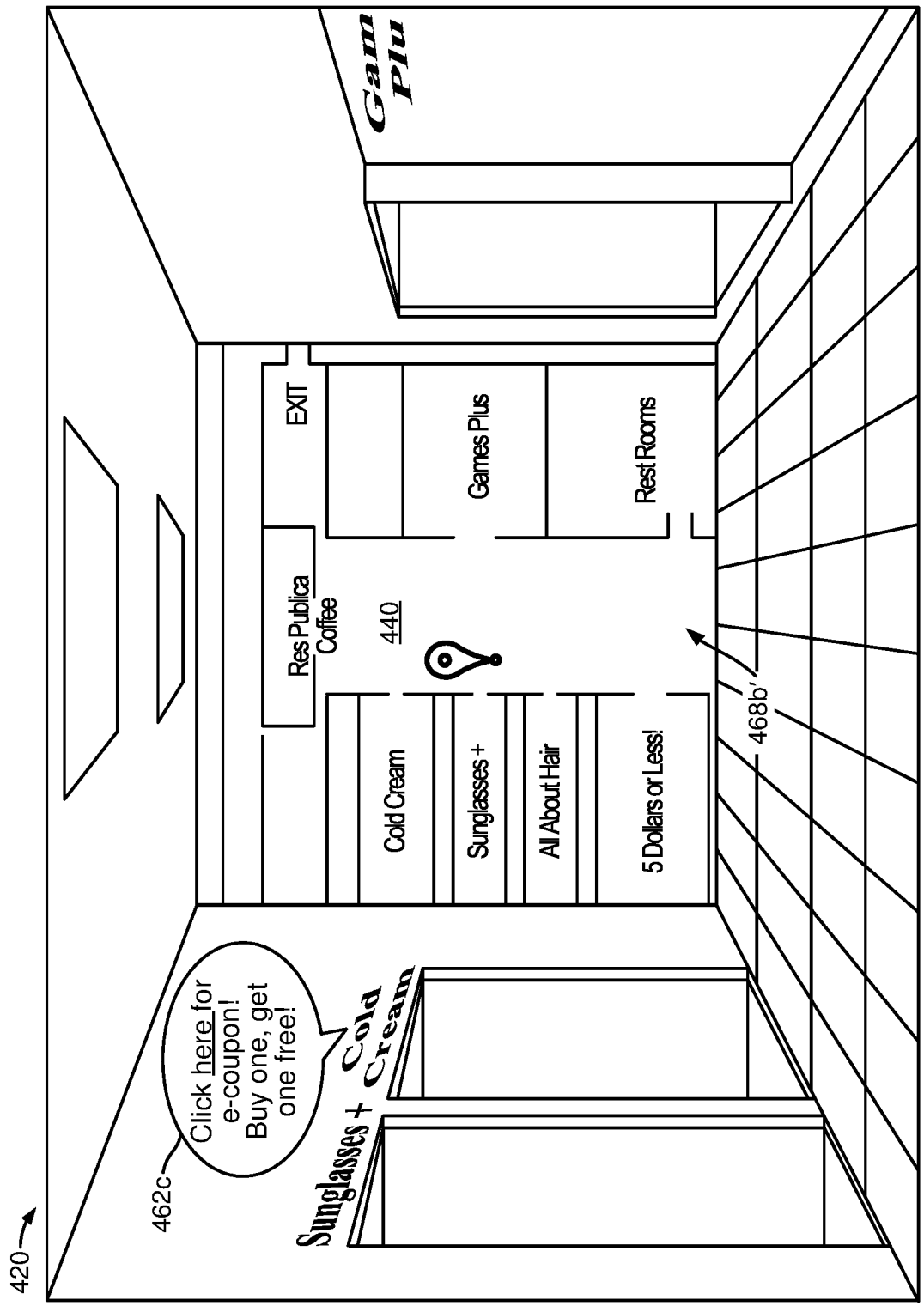
Figure 4C:
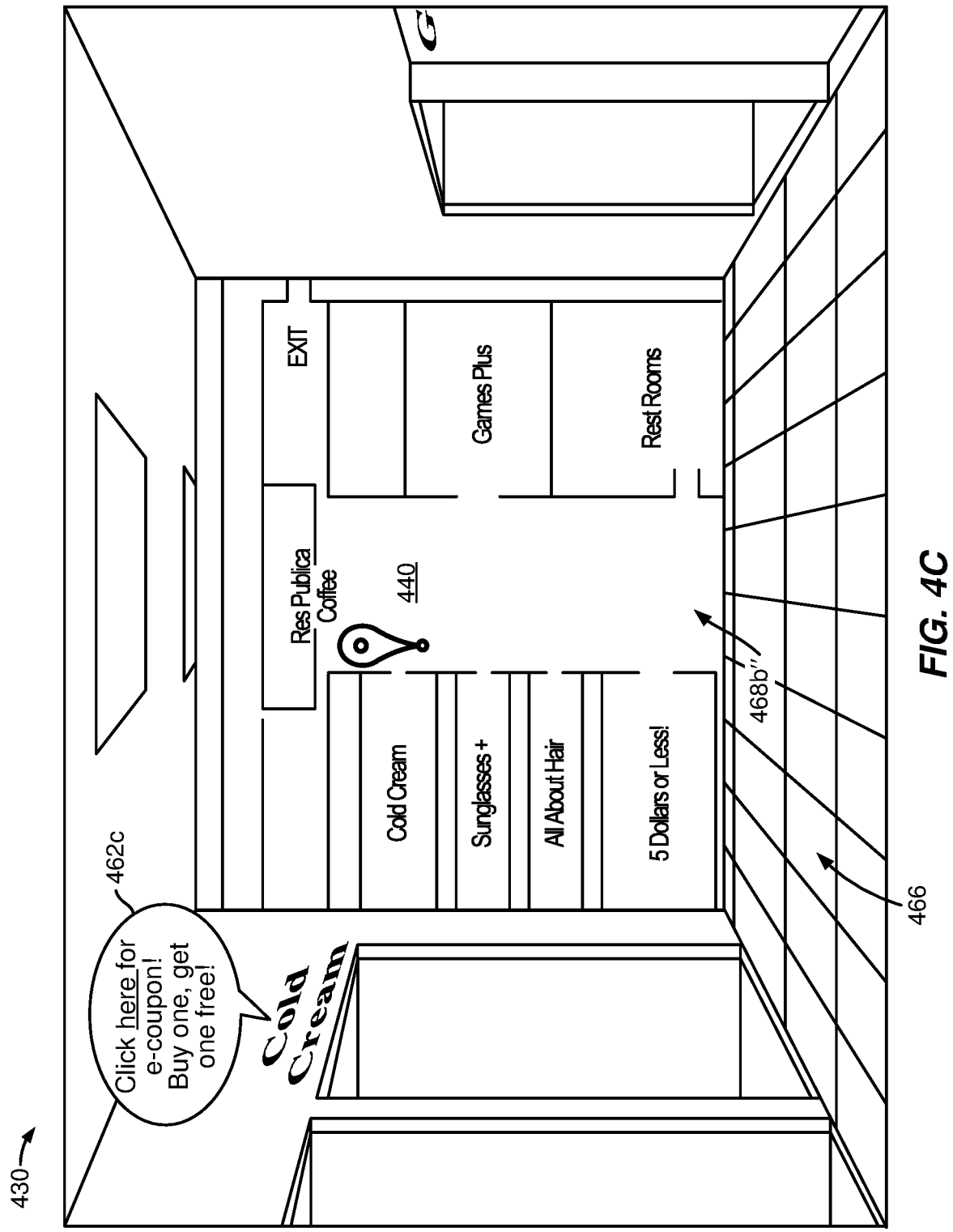
Figure 4D:
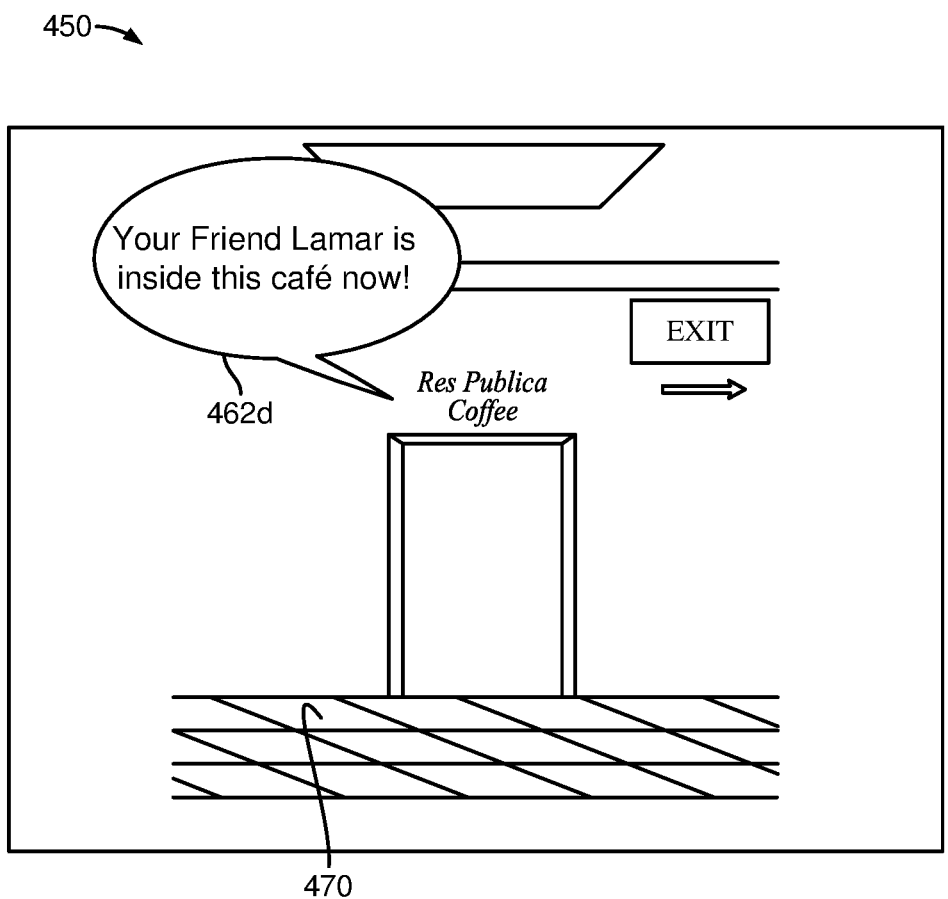

FIGS. 4A-4D illustrate embodiments of an image of a mobile device camera view of the live scene displayed on the screen of a mobile device while an auxiliary object is docked to a feature in the image. In this example, FIG. 4A illustrates a situation similar to that of FIG. 2B, while FIGS. 4B-4D illustrate successive images of the mobile device camera view 410, 420, 430, 450 where the mobile device is being moved down the corridor 466, thereby drawing closer to (and eventually, in FIG. 4D, crossing,) the passage (corresponding to features 468*b*, 468*b'*, 468*b"*) at the end of corridor 466. As a result, the features 468*b*, 468*b'*, 468*b"* in the image of the mobile device camera view 410, 420, 430 successively get larger within the image of the mobile device camera view. Although in the illustrated example, as features 468*b* increases in size from FIGS. 4A-4C, map 440 is illustrated increasing in scale. However, in alternative implementations, responsive to the increase in the size of the feature 468*b*, 468*b'*, 468*b"* within the image of the mobile device camera view 410, 420, 430 due to movement of the mobile device, the screen displays a larger portion of the at least one auxiliary object at a consistent scale as the features 468*b*, 468*b'*, 468*b"* go from smaller to larger.

In the example shown in FIGS. 4A-4D, the augmented image of the mobile device camera view 410, 420, 430, 450 is updated in real time as the mobile device is moved, where the auxiliary object, in the illustrated example, the map 440, remains docked to the feature 468*b* of the mobile device camera view as the mobile device is moved. Finally, at FIG. 4D, the user, and by extension the mobile device, has passed through the passage corresponding to features 468*b*, 468*b'*, 468*b"*. In this example, the map 440 appeared in the display as a "wall" upon which the map 440 was projected. Once the user has passed through the "wall," in FIG. 4D, the map 440 is no longer visible. The map 440 remained docked to the features 468*b*, 468*b'*, 468*b"* throughout FIGS. 4A-4C until, at FIG. 4D, responsive to the feature 468*b* no longer being within the captured image of the mobile device camera view due to movement of the mobile device, the display or screen no longer displays the at least one auxiliary object, in this example, map 440. In such a case, the mobile device, or one or more processors within the mobile device, remove the at least one auxiliary object from the augmented image. Now that "Res Publica Coffee" is in view in FIG. 4D, in one example, AR data 462*d* related to this mall location is displayed in the augmented image of the mobile device camera view 450. In an alternative implementation not illustrated, once the map is no longer displayed in feature 468*b* due to feature 468*b* no longer remaining within the mobile device camera view 450, the map may be automatically, by default, docked to another feature in the captured image of the mobile device camera view, for example feature 470 corresponding to the floor. In one implementation, for example, the map (or any other auxiliary object) may, due to feature 468*b* no longer remaining within the mobile device camera view 450, snap to another feature, where the other feature is visible in the captured image. The other feature can be, for example, a similar feature to feature 468*b*, or could alternatively be a default feature for docking the auxiliary object. For example, supposing that feature 468*b* were a first window (or first storefront, etc.), and due to movement of the mobile device the first window (or first storefront, etc.) no longer remained within the mobile device camera view 450, the map could automatically snap to a second window (or second storefront, etc.). Hence, supposing that an auxiliary object was docked to the entrance to the "5 Dollars or Less!" store in FIG. 4A to generate the augmented image, responsive to that entrance no longer being within the field of view of the captured image in FIG. 4B, the auxiliary object may snap to the "Sunglasses+" entrance of FIG. 4B and be displayed in the augmented image as docked to the entrance of the "Sunglasses+" store. Finally, in FIG. 4C, where only a portion of the entrance of the "Sunglasses+" store is visible, the auxiliary object could snap to the entrance of the "Cold Cream" store and be displayed in the augmented image as docked to the entrance of the "Cold Cream" store.

In one aspect of FIGS. 4A-4D, map 440 is also updated as the image of the mobile device camera view changes due to mobile device movement. As shown in FIG. 4A, an indication of a determined location of the mobile device is indicated with the pin drop illustrating that the user is near the "5 Dollars or Less!" store. As the mobile device moves, and a subsequent augmented image of the mobile device camera view is displayed, the map 440 is also updated by updating the indication of the determined location of the mobile device. In FIG. 4B, the map 440 is updated by updating the indication of the determined location of the mobile device and hence the pin drop now indicates that the user is near the "Sunglasses+" store. Finally, in FIG. 4C, the map 440 is updated and the pin drop now shows that the user is near the "Cold Cream" store.

As illustrated in FIGS. 4A-4C, map 440 remained docked to the passage way (corresponding to features 468*b*, 468*b'*, 468*b"*) of the mobile device camera view as the mobile device moved, where the feature 468*b* is stationary in the real world while the mobile device draws closer to the passage way. In another embodiment similar to that illustrated in FIGS. 4A-4C, map 440 (or other auxiliary object) could be docked to a plane in the corridor that remains a certain distance away from the user as the user moves down the corridor. As the user moves, the map 440 remains docked a fixed distance away, but the remainder of the augmented image changes as the scene changes due to the motion of the user holding mobile device, for example, as new stores come into view and old stores go out of view.

Figure 5A:
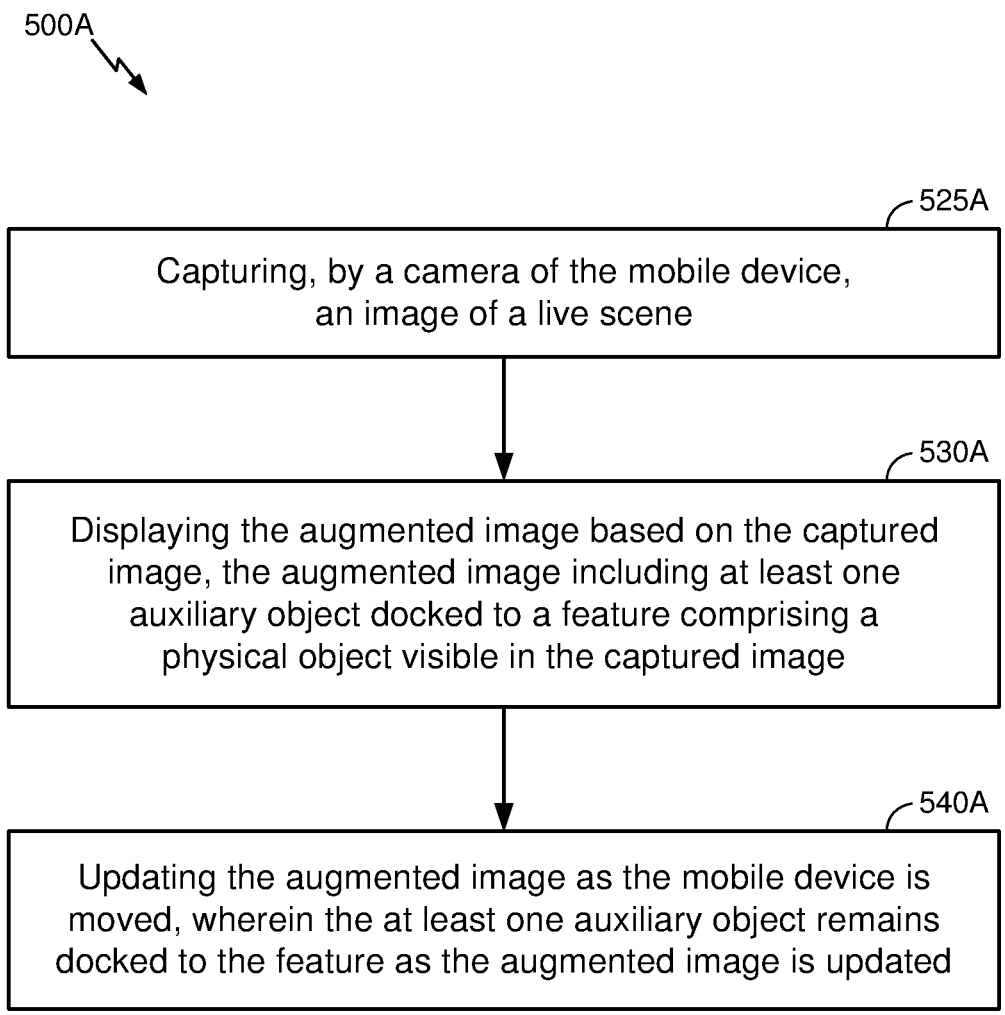
FIG. 5A illustrates an example of a method for displaying, in a mobile device, an augmented image.

FIG. 5A illustrates an example of a method for displaying, in a mobile device, an augmented image, for example the augmented images illustrated in FIGS. 2A, 2B, 3A, 3B, 4A, 4B, and 4C. The method 500A can include block 525A with capturing, by a camera of the mobile device, an image of a live scene. The image of the live scene, for example, can include, as one example, image of live scene displayed on the screen 114 of mobile device 112 with reference to FIG. 1A. Means for performing the functionality of block 525A can include, but are not limited to, camera(s) 650, bus 605, working memory 635, and/or processor(s) 610 of FIG. 6. The method 500A continues at block 530A with displaying the augmented image based on the captured image. Once the image is captured in block 525A, the mobile device, or one or more processors in the mobile device, may determine (or receive an input designating) a feature within the captured image to which to dock the auxiliary object and generate an augmented image with the auxiliary object docked to the feature. The augmented image is generated based on the captured image and the auxiliary object and the augmented image therefore includes the auxiliary object. In some implementations, the auxiliary object may be opaque or may be semi-transparent. In an opaque implementation, the augmented image includes both the auxiliary object as well as portions of the captured image not covered by the auxiliary object. In a semi-transparent implementation, the augmented image may include the captured image with the semi-transparent auxiliary object covering portions of the captured image but with aspects of the captured image in the covered portions still remaining visible "behind" the auxiliary object. Block 530A and block 530B of method 500B of FIG. 5B described below can correspond to each other, and the teachings with reference to one block can apply to the other block. The method 500A continues at block 540A with updating the augmented image as the mobile device is moved, wherein the at least one auxiliary object remains docked to the feature as the augmented image is updated. Block 540A and block 540B of method 500B of FIG. 5B described below can correspond to each other, and the teachings with reference to one block can apply to the other block.

Figure 5B:
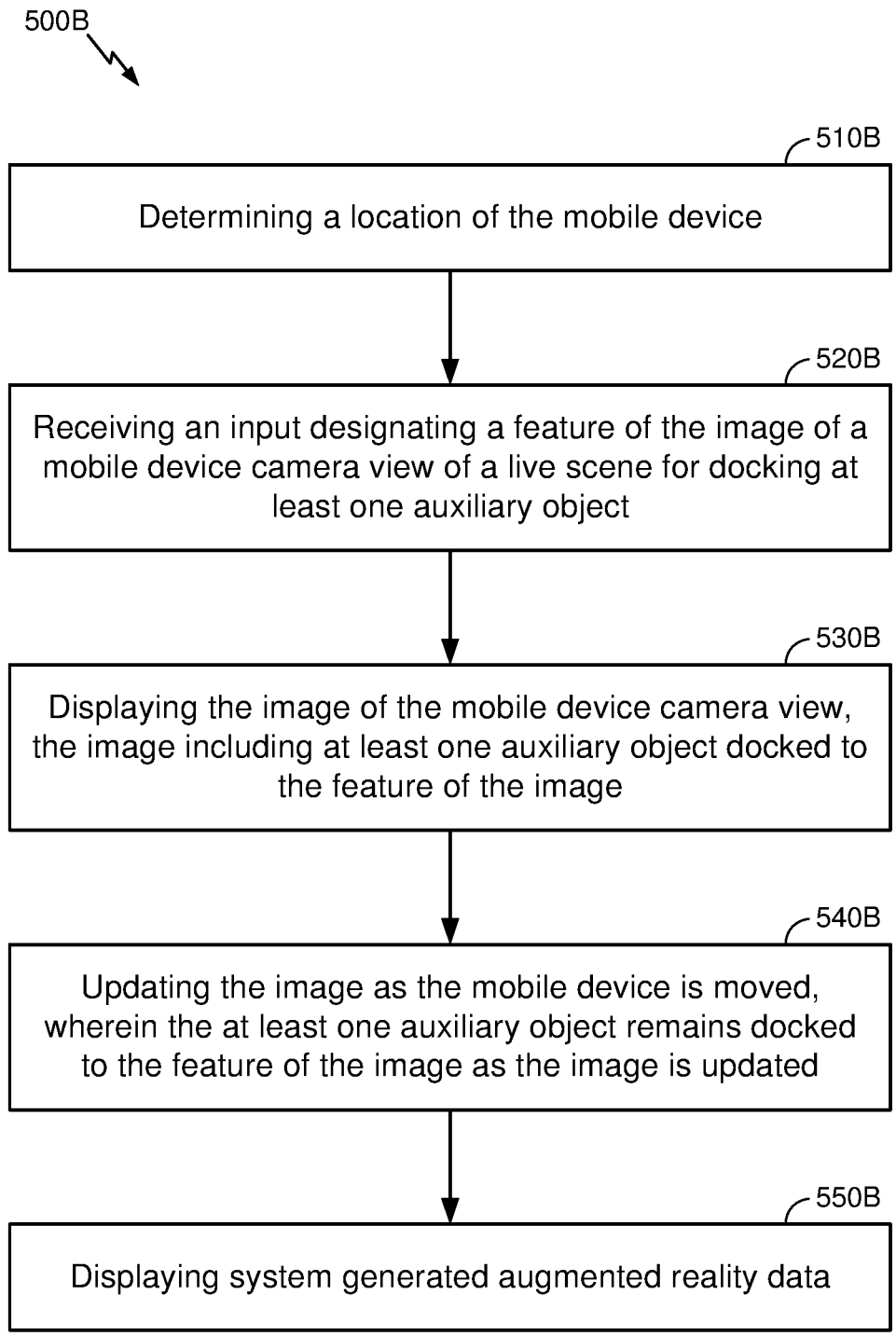
FIG. 5B illustrates an example of a method for displaying an image of a mobile device camera view of a live scene while displaying at least one auxiliary object.

FIG. 5B illustrates an example of a method for displaying an image of a mobile device camera view of a live scene while displaying at least one auxiliary object, for example the images of the mobile device camera view illustrated in FIGS. 2A, 2B, 3A, 3B, and 4A-4D. The method 500B for displaying, in a mobile device, such as mobile device 112 of FIG. 1A, an image of a mobile device camera view of a live scene captured by a camera of the mobile device can optionally include optional block 510B with determining a location of the mobile device. One example of a mobile device is illustrated with reference to FIG. 6. Such an implementation for a mobile device can include components capable of computing a location of the mobile device, such as a location engine. The optionally computed mobile device location can be used in various aspects of the method discussed herein. Means for performing the functionality of optional block 510B can include, but are not limited to, global navigation satellite system (GNSS) receiver 660, communications subsystem(s) 630, location engine 670, bus 605, storage device(s) 625, working memory 635, and/or processor(s) 610 of FIG. 6.

The method 500B continues at optional block 520B with receiving an input designating the area or feature of the image of the mobile device camera view of a live scene for docking the at least one auxiliary object. With reference to FIG. 1C, features 168a, 168b, 168c, 168d (for example) may be automatically identified by the mobile device or may be user-specified. In implementations where the features visible in the image for docking the auxiliary object are automatically or by default identified, the default location could be user-defined. Alternatively, the default feature for docking the auxiliary object could be the last feature or a feature similar to the last feature on which the auxiliary object was docked. Hence, in an embodiment where a user had previously selected a window for docking the auxiliary object, the mobile device may select a window visible in the image for docking the auxiliary object, which the user may then, for example, manually change. In one implementation, the user may touch or otherwise select one of features 168a, 168b, 168c, 168d (for example) for docking the auxiliary object to the selected feature of the image of the mobile device camera view, with the touchscreen of the mobile device generating a signal in response thereto. In one such implementation, the user may touch or tap an edge of one of features 168a, 168b, 168c, 168d, or any point within features 168a, 168b, 168c, 168d, to designate the feature for docking. Additionally or alternatively, the user may drag the auxiliary object, or an icon representing the auxiliary object, over different portions the image of the live scene. The mobile device may then highlight a feature, for example one of features 168a, 168b, 168c, 168d, over which the auxiliary object is currently hovering as the user drags the auxiliary feature around. When the user releases from touching the touchscreen, the mobile device can receive the released touch as an input for selecting the feature over which the auxiliary object, or auxiliary object icon, was hovering at the time the user's touch was released. Hence, a touchscreen display may be configured to, or one or more processors controlling the touchscreen display can be configured to, to receive a tap gesture or a drag gesture by a user and generate the input to dock the auxiliary object based on the tap or drag gesture. The processor(s) of the mobile device then receives such a signal and recognizes the signal as an input to dock the auxiliary object to the selected feature. Then, one or more processors of the mobile device are configured to dock, responsive to the input, the auxiliary object to the designated feature. In one implementation, the input designating the feature to dock the auxiliary object may include a snap to edge or snap to corner feature, allowing a user to move the auxiliary object over the image of the camera view of the live scene, where the mobile device is configured to snap edges or corners of the auxiliary object to edges or corners of various features in the image so that user need not perfectly place the auxiliary object over the feature to which it is to be docked. Means for performing the functionality of optional block 520B can include, but are not limited to, input device(s) 615 (such as, for example, touchscreen 617), bus 605, working memory 635, and/or processor(s) 610 of FIG. 6. In embodiments where a user selects a feature in the displayed image of the mobile device camera view for docking the auxiliary object, the touchscreen may receive an input to dock the auxiliary object to the feature of the image of the mobile device camera view. The touchscreen may also generate a signal responsive to the touch selection of the user, and hence the processor may also receive an input, for example the signal from the touchscreen, to dock the auxiliary object. Subsequent to the processor receiving the input, the processor may then execute instructions to display the at least one auxiliary object docked to the designated feature.

The method 500B continues at block 530B with displaying the image of the mobile device camera view including the at least one auxiliary object docked to the feature of the image of the mobile device camera view. As noted above, the image of the mobile device camera view can be generated by first capturing an image of the live scene using a camera of the mobile device, which may then be displayed on a display or screen of the mobile device. With reference to FIGS. 2A and 2B, the auxiliary object can include a map, such as a top-down map, associated with the location of the mobile device determined at optional block 510B. In one such example, the top-down map may be displayed on or over a physical object in the image of the mobile device camera view. In other implementations, the auxiliary object can include a browser, an interface for a mobile-based application (e.g., a keypad for a mobile device native phone application, a text messaging application, a mobile device news application (which could include images, text, or video), a video displaying application, etc.), etc. As illustrated in, for example, FIGS. 3A, 3B, and 4A-4D, the image of the auxiliary object replaces the portion of the image of the mobile device camera view in the area corresponding to the feature to which the auxiliary object is docked. However, in other unillustrated examples, the auxiliary object may be transparent or semi-transparent, allowing some aspects of the live scene in the area corresponding to the feature to be visible as though the auxiliary object were a semitransparent window through which the live scene in the area can be seen. Means for performing the functionality of block 530B can include, but are not limited to, display(s) 620, camera(s) 650, bus 605, working memory 635, and/or processor(s) 610 of FIG. 6.

The method 500B continues at block 540B with updating the image of the mobile device camera view as the mobile device is moved while the auxiliary object remains docked to the feature of the image. With reference to FIGS. 3A, 3B, and 4A-4D, as the camera of the mobile device captures new images of the live scene in real time as the user moves through the user's environment, the image of the mobile device camera view is updated on the screen of the mobile device and the auxiliary object remains docked to the feature of the image of the mobile device camera view. The auxiliary object remains docked as the size, shape, and/or orientation of the feature in the image of the mobile device camera view changes due to the movement of the user holding the mobile device with the camera that is capturing the image of the mobile device camera view. In some implementations, the orientation of the auxiliary object may also respond to changes in orientation of the image. Hence, responsive to changes in the image of the mobile device camera view due to changes in the orientation of the camera of the mobile device capturing the image, the mobile device may change the orientation of the image of the auxiliary object displayed in the image of the mobile device camera view. Similarly, as the feature pans into, and out of, view within the image of the mobile device camera view, the auxiliary object remains docked to the feature. In one embodiment, where the auxiliary object is a top-down map, the top-down map can include an indication of the determined location (block 510B) of the mobile device, as shown by the pin drop in FIGS. 4A, 4B, and 4C. As shown in the example images in FIGS. 4A, 4B, and 4C, as the image of the mobile device camera view is updated as the mobile device moves, this also includes updating the top-down map, for example, by updating the indication of the determined location of the mobile device as the location changes as the mobile device is moved. In FIGS. 4A, 4B, and 4C, this is shown as the pin drop moves from figure to figure. Means for performing the functionality of block 540B can include, but are not limited to, display(s) 620, input device(s) 615 (including, for example, camera(s) 650, accelerometer(s), magnetometer(s), gyroscope(s)), bus 605, working memory 635, and/or processor(s) 610 of FIG. 6.

The method 500B optionally continues at optional block 550B with displaying system generated augmented reality data associated with objects in the image of the mobile device camera view. With reference to, for example, FIGS. 2A and 2B, the image of the mobile device camera view can include, in addition to the auxiliary object docked to the feature, other AR data 262a, 262b, 262c. Such AR data can be associated with the location of the mobile device determined in optional block 510B. Such data may additionally or alternatively be associated with objects detected by the mobile device within the image of the mobile device camera view with or without reference to the location of the mobile device. Means for performing the functionality of optional block 550B can include, but are not limited to, display(s) 620, bus 605, working memory 635, and/or processor(s) 610 of FIG. 6.

Figure 6:
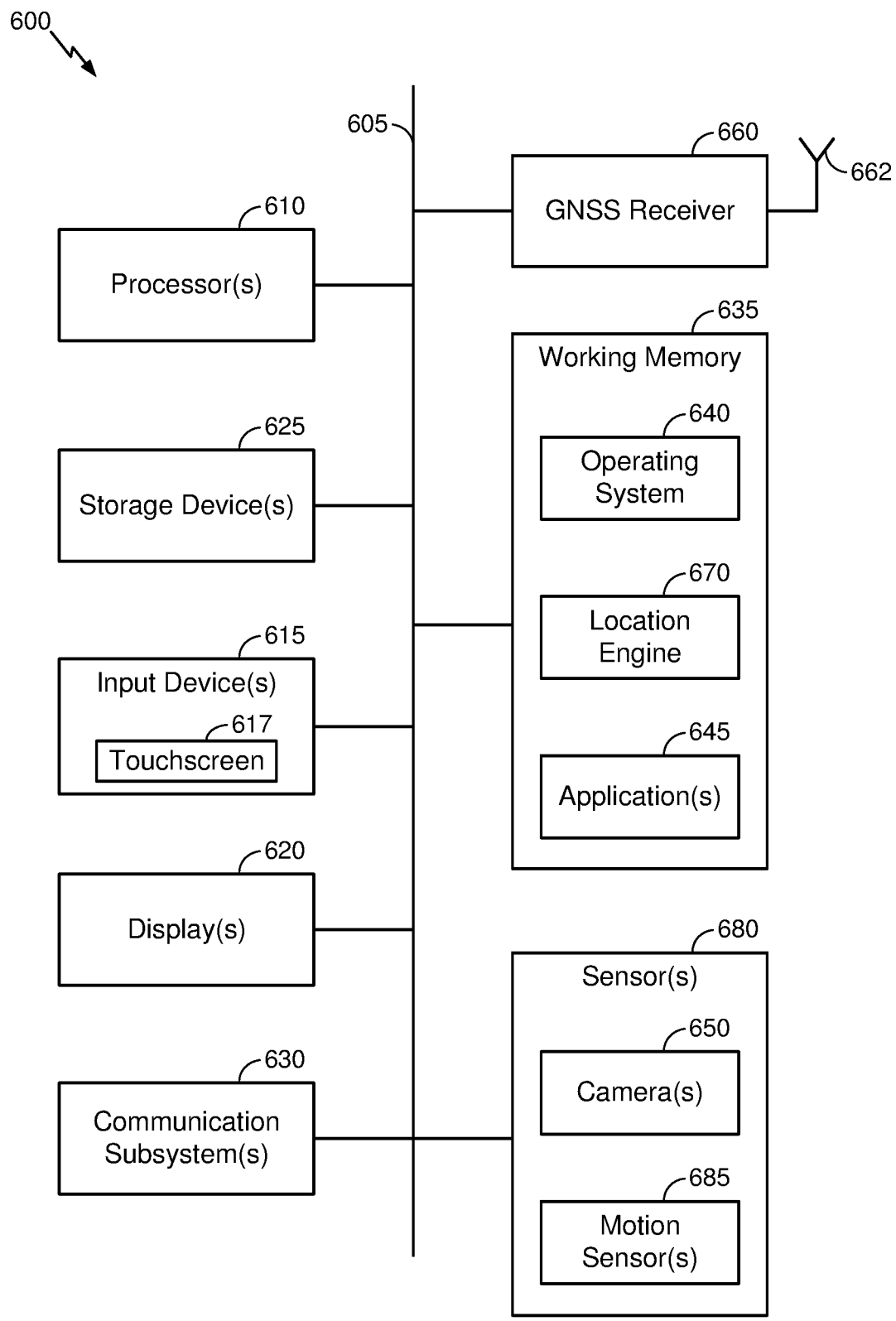
FIG. 6 illustrates an example of a mobile device according to embodiments of the disclosure.

FIG. 6 illustrates an example of a mobile device according to embodiments of the disclosure, such as mobile device having a screen displaying the various images described elsewhere throughout this disclosure. The mobile device can also be considered a computing device 600, or alternatively, computing device 600 may represent some of the components of a mobile device or any other computing device. Examples of mobile device and/or computing device 600 include, but are not limited to, video game consoles, tablets, smart phones, laptops, netbooks, or other portable devices. FIG. 6 provides a schematic illustration of one embodiment of computing device 600 that may perform the various functions described herein, including, for example, method 500A of FIG. 5A and/or 500B of FIG. 5B. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

Computing device 600 is shown comprising hardware elements that may be electrically coupled via a bus 605 (or may otherwise be in communication, as appropriate). The hardware elements may include one or more processor(s) 610, including, without limitation, one or more general-purpose processors and/or one or more special-purpose processors (such as digital signal processing chips, graphics acceleration processors, and/or the like). The one or more processor(s) 610 are coupled to memory 635, camera(s) 650, and display(s) 620 via bus 605 and can be configured to present an augmented image on the display(s) 620 based on an image captured by camera(s) 650, the augmented image including at least one auxiliary object docked to a feature comprising a physical object visible in the captured image and subsequently update the augmented image as the mobile device is moved such that the at least one auxiliary object remains docked to the feature as the augmented image is updated. The hardware elements may further include one or more input devices 615, which may include, without limitation, a touchscreen 617, a mouse, a keyboard and/or the like; and one or more display(s) 620, which may be configured, for example, to display an image of a mobile device camera view, to display AR data, and/or to display an augmented image based on a captured image of a live scene and an auxiliary object docked to a feature visible in the captured image). While touchscreen 617 and display 620 are illustrated as separate blocks in FIG. 6, it is understood that they may be integrated into a single device as a touchscreen display capable of displaying images and/or video while also receiving touch input from a user. Sensor(s) 680 may include camera(s) 650, although illustrated as separate. Camera(s) 650 may capture successive frames of images of an environment, thereby capturing images of a camera view of a live scene in real time as described elsewhere in the specification. Sensor(s) 680 may also include motion sensor(s) 685. Motion sensor(s) 685 can include, for example, accelerometer(s) (for example, a three-axis accelerometer), magnetometer(s), gyroscope(s) (for example, a three-axis gyroscope), which can be used, in some embodiments, to help determine a position, orientation, and/or attitude of the mobile device. For example, once a good position is determined using wireless signals, such as satellite signals, wide area network signals, or wireless local area network signals, subsequent positions can be computed using dead reckoning methods with such sensors for some time before errors eventually become too large.

Computing device 600 may further include (and/or be in communication with) one or more non-transitory storage device(s) 625, which may comprise, without limitation, local and/or network accessible storage, and/or may include, without limitation, a disk drive, a drive array, an optical storage device, a solid-form storage device such as a random-access memory (RAM) and/or a read-only memory (ROM), which may be programmable, flash-updateable and/or the like. Such storage devices may be configured to implement any appropriate data storage, including, without limitation, various file systems, database structures, and/or the like.

Computing device 600 may also include a communications subsystem(s) 630. Communications subsystem(s) 630 may include a transceiver for receiving and transmitting data or a wired and/or wireless medium. Communications subsystem(s) 630 may also include, without limitation, a modem, a network card (wireless or wired), an infrared communication device, a wireless transceiver and/or communication device and/or chipset (such as a Bluetooth™ device, a wireless local area network (WLAN) device, an 802.11 device, a Wi-Fi device, a wireless wide area network (WWAN) device, a worldwide interoperability for microwave access (WiMax) device, cellular communication facilities, etc.), and/or the like. Communications subsystem(s) 630 may permit data to be exchanged with a network, other computing devices, and/or any other devices described herein. In one example, the communications subsystem(s) 630 may be used to transmit requests for data, and receive data, such as, for example, map associated with a location of the mobile device, AR data associated with the location of the mobile device and/or associated with environmental elements and/or objects in an image a camera view of a live scene associated with the location of the mobile device. More generally, data associated with an auxiliary object, such as an image of the auxiliary object, data to generate such an image of the auxiliary object or other data associated with the auxiliary object may also be received using the communications subsystem(s) 630. In one implementation, the communications subsystem(s) 630 can be configured to communicate with one or more servers, for example, to transmit requests for data to the one or more servers associated with the auxiliary object (or augmented reality data) in order to display the auxiliary object (or augmented reality data), and to receive the data from the one or more servers and communicate the received data to the processor(s) 610 for further processing in order to, for example, display the auxiliary object in the augmented image. In one example, the communications subsystem(s) 630 transmits a location determined for the mobile device to a map server, receives data for displaying the map from the map server, and communicates the received data to, for example, processor(s) 610 for displaying the map docked to the feature on the display(s) 620. In implementations where the map will also be displaying a route for navigating or walking to a location, the communications subsystem(s) 630 may also request route data from a route server to enable the mobile device to further display a route on the displayed map. In other examples, the data associated with the auxiliary object or augmented reality data can include a video feed from a remote camera, data from servers associated with the display of augmented reality data (such as data from marketing servers, or servers owned by a business within the venue), data from servers that deliver data associated with a browser (where the auxiliary object is a browser window), or data associated with a mobile device application where the mobile device application receives such data from a remote server. Additionally, in implementations where communications subsystem(s) 630 include wireless transceiver(s), such wireless transceiver(s) can help determine the location of the mobile device by performing measurements of wireless signals, such as WLAN and WWAN signals.

Computing device 600 may also include a global navigation satellite system (GNSS) receiver 660 and GNSS antenna 662. The GNSS receiver 660 may measure various signals received from satellites belonging to a satellite positioning system (SPS) such as global positioning system (GPS), GLObal NAvigation Satellite System (GLONASS), Galileo or Beidou. These signal measurements may be utilized to determination a location of the mobile device either alone or in combination with terrestrial signals such as WAN, WLAN and/or other wireless signals which may be received and/or measured by, for example, communications subsystem(s) 630. In one optional example, the computing device 600 may also include a location engine 670 which can reside within working memory 635, communications subsystem(s) 630, GNSS receiver 660, and/or elsewhere, which may be configured to take inputs from these various subsystems including, but not limited to, for example, GNSS receiver 660, communications subsystem(s) 630, input device(s) 615 such as sensors (in particular, motion sensors), to compute a location of the mobile device.

In many embodiments, computing device 600 may further comprise a non-transitory working memory 635, which may include a read-only memory (ROM) device. Computing device 600 may comprise software elements, shown as being currently located within the working memory 635, including an operating system 640, device drivers, executable libraries, and/or other code, such as one or more application program(s) 645, which may comprise computer programs provided by various embodiments, and/or may be designed to implement methods, and/or configure systems, provided by other embodiments, as described herein. An interface for one or more application program(s) 645 could be an auxiliary object that is docked to a feature of a mobile device camera view displayed on a screen of a mobile device. Additionally or alternatively, an application program could function to display the image of the mobile device camera view with the auxiliary object docked to the feature of the image. Merely by way of example, one or more procedures described with respect to the method(s) discussed above might be implemented as code and/or instructions executable by a computer (and/or a processor within a computer), such as the example methods illustrated in FIGS.

5A and/or 5B; in an aspect, then, such code and/or instructions may be used to configure and/or adapt a general purpose computer (or other device) to perform one or more operations in accordance with the described methods.

As described elsewhere in greater detail, such instructions stored on a non-transitory computer readable medium for execution by one or more processors of a mobile device may, in various implementations, include instructions to perform operations corresponding to any of the functions disclosed herein, for example those illustrated in FIGS. 5A and/or 5B, the operations comprising, for example, capturing, using camera(s) 650, an image of a live scene, displaying, on display(s) 620, an augmented image based on the captured image, the augmented image including at least one auxiliary object docked to a feature comprising a physical object visible in the captured image, and updating the augmented image on display(s) 620 as the mobile device is moved, wherein the auxiliary object remains docked to the feature as the augmented image is updated. The operations may further comprise processing an input designating the feature of the image for docking the at least one auxiliary object and/or displaying the at least one auxiliary object docked to the designated feature. The operations can also include displaying, on the display of the mobile device, system generated augmented reality data.

A set of these instructions and/or code might be stored on a computer-readable storage medium, such as storage device(s) 625 described above. In some cases, the storage medium might be incorporated within a computing device, such as computing device 600. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by computing device 600 and/or might take the form of source and/or installable code, which, upon compilation and/or installation on computing device 600 (e.g., using any of a variety of generally available compilers, installation programs, compression/decompression utilities, etc.) then takes the form of executable code.

Some embodiments may employ a computing device (such as computing device 600) to perform methods in accordance with the disclosure. For example, some or all of the procedures of the described methods may be performed by computing device 600 in response to processor(s) 610 executing one or more sequences of one or more instructions (which might be incorporated into operating system 640 and/or other code, such as an application program 645) contained in working memory 635. Such instructions may be read into working memory 635 from another computer-readable medium, such as one or more of storage device(s) 625. Merely by way of example, execution of the sequences of instructions/code contained in working memory 635 might instruct processor(s) 610 to perform one or more procedures of the methods described herein, for example the methods illustrated in FIGS. 5A and/or 5B. Similarly, working memory 635 may, together with processor(s) 610 be configured to perform one or more blocks from the methods illustrated in FIGS. 5A and/or 5B. Additionally or alternatively, the instructions contained in the working memory 635 may instruct the processor(s) 610 to perform, and/or the working memory 635 together with processor(s) 610 may be configured to perform, any of the functionality described in any of FIGS. 2A, 2B, 3A, 3B, and 4A-4D. It is understood that processor(s) 610 performing the functionality associated with any of FIGS. 2A, 2B, 3A, 3B, 4A-4D, 5A, and 5B may include one or more main processors working in coordination with graphics processor(s) and/or other processor(s) associated with display(s) 620.

With reference to the appended figures, components that can include memory can include non-transitory machine-readable media. The terms "machine-readable medium" and "computer-readable medium," as used herein, refer to any storage medium that participates in providing data that causes a machine to operate in a specific fashion. In an embodiment implemented using computing device 600, various computer-readable media might be involved in providing instructions/code to processor(s) 610 for execution and/or might be used to store and/or carry such instructions/code (e.g., as signals). Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a programmable ROM (PROM), an erasable PROM (EPROM), an electrically erasable PROM (EEPROM), a FLASH-EPROM, any other memory chip or cartridge, a carrier wave as described hereinafter, or any other medium from which a computer may read instructions and/or code. In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as storage device(s) 625. Volatile media include, without limitation, dynamic memory, such as working memory 635. Transmission media include, without limitation, coaxial cables, copper wire and fiber optics, including the wires comprising the bus 605, as well as the various components of communications subsystem 630 (and/or the media by which communications subsystem 630 provides communication with other devices, including air for wireless devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in the analog domain.

Various forms of computer-readable media may be involved in carrying one or more sequences of one or more instructions to processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 600. These signals, which might be in the form of electromagnetic signals, acoustic signals, optical signals and/or the like, are all examples of carrier waves on which instructions may be encoded, in accordance with various embodiments of the disclosure.

Communications subsystem 630 (and/or components thereof) generally will receive the signals, and bus 605 then might carry the signals (and/or the data, instructions, etc., carried by the signals) to working memory 635, from which processor(s) 610 retrieves and executes the instructions. The instructions received by working memory 635 may optionally be stored on non-transitory storage device(s) 625 either before or after execution by processor(s) 610.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the disclosure. Rather, the preceding description of the embodiments will provide those skilled in the art with an enabling description for implementing embodiments of the disclosure. Various changes may be made in the function and arrangement of elements without departing from the spirit and scope of the disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments described herein. Also, a number of steps may be undertaken before, during, or after the above elements are considered. Accordingly, the above description does not limit the scope of the disclosure.

What is claimed is:

1. A method for displaying, in a mobile device, an augmented image, the method comprising:
   capturing, by a camera of the mobile device, an image of a live scene;
   determining a location of the mobile device;
   identifying one or more architectural features of the live scene, wherein the one or more architectural features comprises one or more floors, walls, ceilings, corridors, roads, windows, storefronts or any combination thereof;
   displaying, in a display of the mobile device, the augmented image based on the captured image, the augmented image comprising:
      traffic conditions, estimated time to a destination or both;
      at least a portion of the image of the live scene; and
      a map including an indication of the determined location of the mobile device, wherein the map is docked to the one or more architectural features of the live scene and wherein the map is a navigation path indicating a route to the destination.

2. The method of claim 1, the map is a top-down map, a navigation path indicating a route to a destination, or both.

3. The method of claim 2, wherein the map is independently adjustable to the live scene, wherein independently adjustable comprises enlarged, reduced, panned, translated, oriented or any combination thereof.

4. The method of claim 2, the method comprising receiving user input indicating the one or more architectural features to use for docking the map.

5. The method of claim 2, wherein the map is overlaid in the live scene over an area associated with the one or more architectural features.

6. The method of claim 1, wherein the one or more architectural features are user-defined, user-selected or any combination thereof.

7. The method of claim 1, the method comprises:
   obtaining one or more AR data associated with the location of the mobile device; and
   displaying the one or more AR data in the augmented image based on one or more second features detected in the live scene.

8. A mobile device comprising:
   a camera configured to capture an image of a live scene;
   a display;
   a memory;
   a location engine configured to determine a location of the mobile device;

one or more processors communicatively coupled to the camera, the display, and the memory, the one or more processors configured to:
- capture, by the camera of the mobile device, an image of a live scene;
- identify one or more architectural features of the live scene, wherein the one or more architectural features comprises one or more floors, walls, ceilings, corridors, roads, windows, storefronts or any combination thereof;
- display, in the display of the mobile device, the augmented image based on the captured image, the augmented image comprising:
  - traffic conditions, estimated time to a destination or both;
  - at least a portion of the image of the live scene; and
  - a map including an indication of the determined location of the mobile device, wherein the map is docked to the one or more architectural features of the live scene.

9. The mobile device of claim 8, the map is a top-down map, a navigation path indicating a route to a destination, or both.

10. The mobile device of claim 9, wherein the map is independently adjustable to the live scene, wherein independently adjustable comprises enlarged, reduced, panned, translated, oriented or any combination thereof.

11. The mobile device of claim 9, the one or more processors configured to receive user input indicating the one or more architectural features to use for docking the map.

12. The mobile device of claim 9, wherein the map is overlaid in the live scene over an area associated with the one or more architectural features.

13. The mobile device of claim 8, wherein the one or more architectural features are user-defined, user-selected or any combination thereof.

14. The mobile device of claim 8, the one or more processors configured to:
- obtain, via one or more transceivers, one or more AR data associated with the location of the mobile device; and
- display, via the display, the one or more AR data in the augmented image based on one or more second features detected in the live scene.

15. A mobile device comprising:
- means for capturing an image of a live scene;
- means for determining a location of the mobile device;
- means for identifying one or more architectural features of the live scene, wherein the one or more architectural features comprises one or more floors, walls, ceilings, corridors, roads, windows, storefronts or any combination thereof;
- means for displaying the augmented image based on the captured image, wherein the augmented image comprises:
  - traffic conditions, estimated time to a destination or both;
  - at least a portion of the image of the live scene; and
  - a map including an indication of the determined location of the mobile device, wherein the map is docked to the one or more architectural features of the live scene.

16. The mobile device of claim 15, the map is a top-down map, a navigation path indicating a route to a destination, or both.

17. The mobile device of claim 16, wherein the map is independently adjustable to the live scene, wherein independently adjustable comprises enlarged, reduced, panned, translated, oriented or any combination thereof.

18. The mobile device of claim 16, the mobile device comprising means for receiving user input indicating the one or more architectural features to use for docking the map.

19. The mobile device of claim 15, wherein the one or more architectural features are user-defined, user-selected or any combination thereof.

20. A non-transitory computer-readable medium for displaying an augmented image comprising processor-executable program code configured to cause one or more processors to:
- capture an image of a live scene;
- determine a location of the mobile device;
- identify one or more architectural features of the live scene, wherein the one or more architectural features comprises one or more floors, ceilings, corridors, roads, windows, storefronts or any combination thereof;
- display the augmented image based on the captured image, wherein the augmented image comprises:
  - traffic conditions, estimated time to a destination or both;
  - at least a portion of the image of the live scene; and
  - a map including an indication of the determined location of the mobile device, wherein the map is docked to the one or more architectural features of the live scene.

* * * * *